US011181498B2

(12) United States Patent
Redinger et al.

(10) Patent No.: US 11,181,498 B2
(45) Date of Patent: Nov. 23, 2021

(54) TEMPERATURE-INDEPENDENT VERIFYING OF STRUCTURAL INTEGRITY OF MATERIALS USING ELECTRICAL PROPERTIES

(71) Applicant: 3M INNOVATIVE PROPERTIES COMPANY, St. Paul, MN (US)

(72) Inventors: David H. Redinger, Afton, MN (US); Christopher R. Yungers, Saint Paul, MN (US); Jennifer F. Schumacher, Woodbury, MN (US)

(73) Assignee: 3M INNOVATIVE PROPPERTIES COMPANY, St. Paul, MN (US)

( * ) Notice: Subject to any disclaimer, the term of this patent is extended or adjusted under 35 U.S.C. 154(b) by 43 days.

(21) Appl. No.: 16/461,438

(22) PCT Filed: Nov. 15, 2017

(86) PCT No.: PCT/US2017/061785
§ 371 (c)(1),
(2) Date: May 16, 2019

(87) PCT Pub. No.: WO2018/093889
PCT Pub. Date: May 24, 2018

(65) Prior Publication Data
US 2019/0346394 A1    Nov. 14, 2019

Related U.S. Application Data

(60) Provisional application No. 62/422,914, filed on Nov. 16, 2016.

(51) Int. Cl.
*G01N 27/20* (2006.01)

(52) U.S. Cl.
CPC .................. *G01N 27/20* (2013.01)

(58) Field of Classification Search
None
See application file for complete search history.

(56) References Cited

U.S. PATENT DOCUMENTS

| 4,764,970 A | 8/1988 | Hayashi et al. |
| 4,785,243 A | 11/1988 | Abramczyk et al. |
| (Continued) | | |

FOREIGN PATENT DOCUMENTS

| CN | 101832970 A | 9/2010 |
| CN | 205003121 U | 1/2016 |
| (Continued) | | |

OTHER PUBLICATIONS

Anatychuk, L.I., "Procedure and Equipment for Measuring Parameters of Thermoelectric Generator Modules", Journal of Electronic Materials, vol. 40, No. 5, 2011, pp. 1292-1297.

(Continued)

*Primary Examiner* — Nasima Monsur
(74) *Attorney, Agent, or Firm* — Sriram Srinivasan; Thomas M. Spielbauer

(57) ABSTRACT

Systems and methods for detecting a crack or defect in a material are described. An example method may include determining, by a computing device, for each respective adjacent pair of electrodes of a plurality of electrodes electrically coupled to the material, a respective electrode pair voltage. The method also may include determining, by the computing device, for each respective adjacent pair of electrodes, a respective temperature-corrected electrode pair value based on the respective electrode pair voltage and at least one of a respective control voltage associated with the respective adjacent pair of electrodes or a temperature correction factor. The method may further include determining, by the computing device, whether the material includes (Continued)

a crack or defect based on the plurality of respective temperature-corrected electrode pair values.

18 Claims, 9 Drawing Sheets

(56) References Cited

U.S. PATENT DOCUMENTS

| | | | |
|---|---|---|---|
| 4,914,378 | A | 4/1990 | Hayashi et al. |
| 5,258,708 | A | 11/1993 | Sadeghi et al. |
| 6,150,809 | A | 11/2000 | Tiernan et al. |
| 6,210,972 | B1 | 4/2001 | Williams et al. |
| 6,218,846 | B1 * | 4/2001 | Ludwig ............ G01R 1/07342 324/713 |
| 6,288,528 | B1 | 9/2001 | Goodstein et al. |
| 6,476,624 | B1 * | 11/2002 | Chuman ............ G01N 27/20 324/522 |
| 6,922,641 | B2 | 7/2005 | Batzinger et al. |
| 7,161,356 | B1 | 1/2007 | Chien |
| 7,443,177 | B1 | 10/2008 | Bowler |
| 7,596,470 | B2 | 9/2009 | Kim |
| 7,705,589 | B2 | 4/2010 | Kim et al. |
| 8,327,306 | B2 | 12/2012 | Oh et al. |
| 8,552,752 | B2 | 10/2013 | Qiu |
| 8,624,401 | B2 | 1/2014 | Ishikawa |
| 8,816,705 | B2 | 8/2014 | Espejord |
| 9,037,430 | B1 | 5/2015 | Wiggins et al. |
| 2002/0024346 | A1 | 2/2002 | Ikuta et al. |
| 2003/0184321 | A1 | 10/2003 | Hands |
| 2004/0021461 | A1 | 2/2004 | Goldfine et al. |
| 2004/0241890 | A1 | 12/2004 | Steele et al. |
| 2005/0251062 | A1 | 11/2005 | Choi et al. |
| 2006/0283262 | A1 | 12/2006 | Smits et al. |
| 2007/0046587 | A1 * | 3/2007 | Takahara ............ G09G 3/3233 345/76 |
| 2007/0250277 | A1 * | 10/2007 | Hagit ............ G01N 27/20 702/64 |
| 2008/0001608 | A1 | 1/2008 | Saulnier et al. |
| 2008/0191706 | A1 | 8/2008 | Burnett et al. |
| 2009/0121727 | A1 | 5/2009 | Lynch et al. |
| 2009/0192730 | A1 | 7/2009 | Tada |
| 2009/0202387 | A1 | 8/2009 | Dlugos, Jr. et al. |
| 2011/0001498 | A1 * | 1/2011 | Espejord ............ G01N 27/20 324/693 |
| 2011/0060536 | A1 | 3/2011 | Feng |
| 2012/0013483 | A1 | 1/2012 | Jung et al. |
| 2012/0024346 | A1 | 2/2012 | Bystrom et al. |
| 2012/0153740 | A1 | 6/2012 | Soar |
| 2012/0177177 | A1 | 7/2012 | Masters |
| 2012/0235693 | A1 * | 9/2012 | Feng ............ G01N 27/20 324/693 |
| 2013/0307566 | A1 | 11/2013 | Malone et al. |
| 2014/0062521 | A1 | 3/2014 | Yamada |
| 2014/0152336 | A1 | 6/2014 | Sasaki et al. |
| 2014/0354307 | A1 | 12/2014 | Clarke et al. |
| 2015/0095000 | A1 | 4/2015 | Patil et al. |
| 2015/0204701 | A1 | 7/2015 | Klicpea |
| 2015/0308980 | A1 | 10/2015 | Bittar et al. |
| 2016/0163607 | A1 | 6/2016 | Oh et al. |
| 2017/0167927 | A1 | 6/2017 | Carkner |

FOREIGN PATENT DOCUMENTS

| | | |
|---|---|---|
| JP | S56-012544 A | 2/1981 |
| JP | S62-047544 A | 3/1987 |
| JP | H03-056848 A | 12/1991 |
| JP | H05-288706 A | 2/1993 |
| WO | WO 89/012833 A1 | 12/1989 |
| WO | WO 2007/075243 A1 | 7/2007 |

OTHER PUBLICATIONS

Aselage, T.L., et al., "Large Enhancement of Boron Carbides' Seebeck Coefficients through Vibrational Softening" Physical Review Letters, vol. 81, No. 11, 1998, pp. 2316-2319.
Hartov, Alex, et al. "Using voltage sources as current drivers for electrical impedance tomography", Measurement Science and Technology, vol. 13, 2002, pp. 1425-1430.
International Search Report for PCT International Application No. PCT/US2017/061785, dated Feb. 19, 2018, 6 pages.
Lazarovitch, R., et al., "Experimental crack identification using electrical impedance tomography", NDT&E International, vol. 35, No. 5, pp. 301-316, Jul. 1, 2002.
Paraskevopoulous, I., "Solar Soldier: Virtual Reality Simulations and Guidelines for the Integration of Photovoltaic Technology on the Modern Infantry Soldier", School of Engineering and Design, Brunel University, U.K. 141-154.
Ruan, Tao, "Development of an Automated Impedance Tomography System and Its Implementation in Cementitious Materials", Clemson University—TigerPrints, All Dissertations Paper 1756, 2016, pp. 25-49, Aug. 25, 2020.
Sauliner, Gary J., et al. "A high-precision voltage source for ETI", Physiological Measurement, Institute of Physics Publishing, Bristol, GB, vol. 27, No. 5, May 1, 2006, pp. S221-S236 (XP020105771).
Steintz, A. "Optimal Camera Placement." 2012 Thesis. (http://www.eecs.berkeley.edu/Pubs/TechRpts/2012/EECS-2012-69.pdf).
Valiant, Leslie G. "The Complexity of Enumeration and Reliability Problems," *SIAM Journal on Computing*, vol. 8, Issue 3, 1979, pp. 410-421.
Zaoui, Abdelhalim "Inverse Problem in Nondestructive Testing Using Arrayed Eddy Current Sensors", Sensors, 2010, vol. 10, p. 8696-8704.

* cited by examiner

TEMPERATURE-INDEPENDENT VERIFYING OF STRUCTURAL INTEGRITY OF MATERIALS USING ELECTRICAL PROPERTIES

CROSS REFERENCE TO RELATED APPLICATIONS

This application is a national stage filing under 35 U.S.C. 371 of PCT/US2017/061785, filed Nov. 15, 2017, which claims the benefit of Provisional Application No. 62/422,914, filed Nov. 16, 2016, the disclosure of which is incorporated by reference in their entirety herein.

TECHNICAL FIELD

The disclosure relates to techniques for verifying structural integrity of conductive or semiconductive materials.

BACKGROUND

Many materials are useful when their mechanical properties remain intact, but less useful when damaged, such as when cracked. Thus, detection whether these materials are damaged is important. As one example, ceramic body plating is used to protect soldiers, police officers, and other security personnel from projectiles. Ceramic body plating may be useful when undamaged, but may be replaced after being damaged, e.g., after cracking.

X-ray scanning, including X-ray radiography and X-ray computed tomography (CT scanning) may be used to detect cracks or other defects in materials. However, such techniques may utilize large and heavy scanners, which may not be easily portable. Further, X-ray scanning and X-ray CT scanning may be relatively expensive, relatively slow, or both.

SUMMARY

In general, this disclosure describes systems and techniques for verifying structural integrity of a material. In the disclosed techniques, a plurality of electrodes are electrically coupled to the material. The plurality of electrodes include a pair of drive electrodes and at least one electrode of a pair of measurement electrodes. In some examples, the other electrode of the pair of measurement electrodes is also one of the plurality of electrodes. In other examples, the other electrode of the pair of measurement electrodes is at a reference voltage. The techniques may include determining an electrode pair voltage for a pair of adjacent electrodes using voltages measured using the pair of measurement electrodes in response to an electrical signal applied to the pair of drive electrodes. The techniques also may include determining a temperature-corrected electrode pair value based on at least one of a temperature correction factor or a control voltage associated with the pair of measurement electrodes. The control voltage may have been determined with the same pair of measurement electrodes at a time at which the material is known to not include a crack or other defect, or may be computed using a model of the material in an intact (undamaged) state. The temperature correction factor may be based on experimentally measured relationships between voltage and temperature, or based on theoretical calculations of relationships between voltage and temperature. By determining a temperature-corrected measurement value, effects of temperature differences in the material may be reduced. The temperature-corrected measurement value may be used to determine whether the material includes a crack or other defect, e.g., by comparing the temperature-corrected value to a threshold value.

In some examples, the disclosure describes a method that includes determining, by a computing device, for each respective adjacent pair of electrodes of a plurality of electrodes electrically coupled to a material, a respective electrode pair voltage. The method also may include determining, by the computing device, for each respective adjacent pair of electrodes, a respective temperature-corrected electrode pair value based on the respective electrode pair voltage and at least one of a respective control voltage associated with the respective adjacent pair of electrodes or a temperature correction factor. The method further may include determining, by the computing device, whether the material includes a crack or defect based on the plurality of respective temperature-corrected electrode pair values.

In some examples, the disclosure describes a system that includes a computing device. The computing device may be configured to determine, for each respective adjacent pair of electrodes of a plurality of electrodes electrically coupled to a material, a respective electrode pair voltage. The computing device also may be configured to determine, for each respective adjacent pair of electrodes, a respective temperature-corrected electrode pair value based on the respective electrode pair voltage and at least one of a respective control voltage associated with the respective adjacent pair of electrodes or a temperature correction factor. The computing device may be further configured to determine whether the material includes a crack or defect based on the plurality of respective temperature-corrected electrode pair values.

In some examples, the disclosure describes a computer readable storage medium including instructions that, when executed, cause a computing device to determine, for each respective adjacent pair of electrodes of a plurality of electrodes electrically coupled to a material, a respective electrode pair voltage. The computer readable storage medium may also include instructions that, when executed, cause the computing device to determine, for each respective adjacent pair of electrodes, a respective temperature-corrected electrode pair value based on the respective electrode pair voltage and at least one of a respective control voltage associated with the respective adjacent pair of electrodes or a temperature correction factor. The computer readable storage medium may further include instructions that, when executed, cause the computing device to determine whether the material includes a crack or defect based on the plurality of respective temperature-corrected electrode pair values.

The techniques described herein may provide one or more advantages. For example, the techniques may facilitate determination of whether a material includes a crack or other defect in spite of changes in temperature of the material between an initial measurement time at which the control voltages are measured and a later time at which the measured voltages are measured. Further, the techniques described herein may be relatively computationally inexpensive, thus being able to be performed using relatively less powerful computing devices. As another example, a crack detection system as described herein may offer improved portability and cost compared to an X-ray radiography or X-ray computed tomography system, while offering sufficient accuracy and detail to enable detection of cracks or other defects in a material being used in the field.

The details of one or more examples are set forth in the accompanying drawings and the description below. Other features, objects, and advantages will be apparent from the description and drawings, and from the claims.

DETAILED DESCRIPTION

Figure 1:
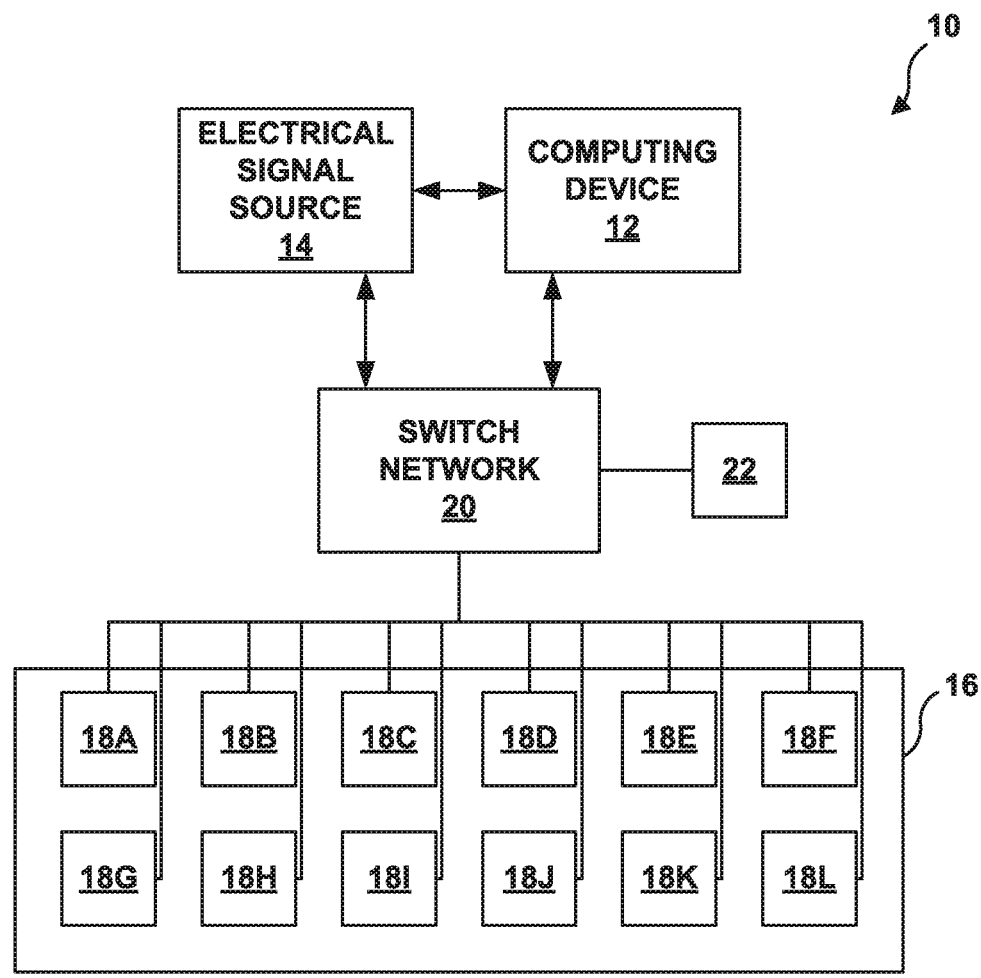
FIG. 1 is a conceptual and schematic block diagram illustrating an example system for determining whether a material includes a crack or other defect based on temperature-corrected electrode pair values.

The disclosure describes systems and techniques for verifying structural integrity of a material. The techniques may reduce effects of changes in temperature in the material and the systems on the determination of whether the material includes a crack or other defect. For example, the techniques may utilize a four-point voltage measurement to reduce or substantially eliminate the effects of electrical property variations in electrical connections between the measurement system and the material, such as within electrical leads, in electrical contacts between the leads and the material. These electrical property variations may be due at least in part to the temperature of the system. Hence, a four-point voltage measurement may reduce effects of changes in the temperature of the system on the determination of whether the material includes a crack or other defect.

Additionally, the techniques for determining whether a material includes a crack or defect may include determining a temperature-corrected electrode pair values based on one or more measured voltages. In some examples, the technique may be differential techniques, in which an electrode pair voltage or set of electrode pair voltages is compared to a control voltage or a set of control voltages. The electrode pair voltage or set of electrode pair voltages are based on voltages measured at a time at which it is desired to determine if the material includes a crack or other defect, and each electrode pair voltage may be associated with an adjacent pair of electrodes electrically coupled to the material.

The voltages may be measured using single-ended voltage measurement or differential voltage measurement. One or both electrodes of a pair of measurement electrodes is electrically coupled to the material. In examples in which both electrodes of the pair of measurement electrodes are electrically coupled to the material, the electrode pair voltage is the voltage difference between the first and second measurement electrodes electrically coupled to the material. In examples in which one electrode of the pair of measurement electrodes is electrically coupled to the material, the other electrode of the pair of measurement electrodes may be at a reference voltage, such as ground. In such examples, the measured voltage is the voltage difference between the first measurement electrode electrically coupled to the material and the second measurement electrode at the reference voltage. Two single-ended measured voltages, each associated with a respective electrode coupled to the material, may be used to determine an electrode pair voltage.

In some examples, the control voltage may be determined for the same material and be associated with the same pair of adjacent electrodes when the material is known to be intact (undamaged), the control voltage may be determined using a model of the material in an intact (undamaged) state, or the control voltage may be determined as an average (e.g., mean) of a plurality of similar materials (e.g., in geometry and composition) that are known to be intact (undamaged).

Once the electrode pair voltage or set of electrode pair voltages is determined, a ratio between a respective electrode pair voltage and a respective control voltage associated with the same pair of adjacent electrodes may be determined. By determining a ratio between the measured voltage and the control voltage, effects of temperature differences in the material between the time at which the control voltage was determined and the electrode pair voltage was determined may be reduced. This may facilitate determination of whether a material includes a crack or other defect by allowing less control over the temperature of the material when the testing is performed.

In other examples, rather than or in addition to utilizing control voltages measured when the material is known to be intact, the electrode pair voltages may be temperature-compensated using a temperature correction factor. The temperature correction factor may be based on experimentally measured relationships between voltage and temperature, or based on theoretical calculations of relationships between voltage and temperature. By determining a temperature-corrected electrode pair value, effects of temperature differences in the material may be reduced. This may facilitate determination of whether a material includes a crack or other defect by allowing less control over the temperature of the material when the testing is performed.

In some examples, techniques described herein may utilize a plurality of adjacent electrodes, each being associated with at least one electrode pair voltage, alone or in combination with control voltages associated with each respective pair of adjacent electrodes. In addition to determining a temperature-corrected electrode pair value for each adjacent pair of electrodes, the techniques may include detrending the temperature-corrected electrode pair values by linear detrending or de-averaging. For example, the techniques may include determining an average temperature-corrected electrode pair value for the plurality of temperature-corrected electrode pair values and subtracting the average temperature-corrected electrode pair value from each respective temperature-corrected electrode pair values to determine a respective temperature-corrected electrode pair value difference or residual temperature-corrected electrode pair value. This causes the average change to be removed from the measured temperature-corrected electrode pair value, leaving only temperature-corrected electrode pair value differences or residual temperature-corrected electrode pair values. These respective temperature-corrected electrode pair value differences, or residual temperature-corrected electrode pair values, may be used to determine whether the material includes a crack or other defect. For example, the respective temperature-corrected electrode pair value differences may be compared to a threshold temperature-corrected electrode pair value difference or otherwise identified as an outlier or a non-outlier, and the number of respective temperature-corrected electrode pair value differences that exceed the threshold temperature-corrected electrode pair value difference or are identified as outliers may be determined. This number of temperature-corrected electrode pair value differences that exceed the threshold temperature-corrected electrode pair value difference may be compared to a threshold number, and if the number of temperature-corrected electrode pair value differences that exceed the threshold temperature-corrected electrode pair value difference is greater than the threshold number, this may indicate that the material includes a crack or other defect. As another example, the respective temperature-corrected electrode pair value differences may be mathematically manipulated to generate an overall score for the material, such as by taking the respective temperature-corrected electrode pair value differences to a predetermined power, such as squaring the respective temperature-corrected electrode pair value differences, cubing the respective temperature-corrected electrode pair value differences, or the like, and summing the resulting products. The result of the mathematical manipulation may be compared to a threshold value, and a result that is greater than the threshold value may indicate that the material includes a crack or other defect. The predetermined power may affect an outcome of the mathematical manipulation and comparison to the threshold value. For example, odd powers may maintain a sign of the respective temperature-corrected electrode pair value difference, which may result in reductions of deviations from a baseline. On the other hand, even powers may emphasize deviations from a baseline, as the sign of the respective temperature-corrected electrode pair value difference is not maintained when taking the respective temperature-corrected electrode pair value difference to an even power.

By utilizing techniques that reduce or substantially eliminate the effect of temperature differences in the measurement system and the material, determination of whether a material includes a crack of other defect may be facilitated. For example, by using a four-point voltage measurement, the contributions of electrical leads coupling the pair of measurement electrodes to the measurement device and any contact-related error sources (e.g., contact resistance) between the pair of measurement electrodes and the material may be reduced or substantially eliminated, as little current flows to the measurement device. Hence, a four-point voltage measurement may facilitate measurement of voltage differences in the material and detection of cracks due to changes in electrical properties. As another example, determining temperature-corrected electrode pair values and optionally detrending the temperature-corrected electrode pair values may reduce or substantially eliminate effects of temperature changes of the material. Combining four-point voltage measurements and determining temperature-corrected electrode pair values may allow determination of whether materials include cracks or other defects without requiring careful control of the temperature of the measurement system and material. This may allow the crack detection systems and techniques described herein to be utilized in conditions or environments that do not permit careful control of the testing conditions, e.g., conditions or environments in which materials are used, rather than dedicated testing facilities.

Other techniques also may be used to detect cracks in a material. For example, X-ray radiography or X-ray computed tomography (CT) may be used to detect cracks in a material. However, X-ray radiography and X-ray CT utilize relatively large, relatively expensive equipment to perform the crack detection. This may prevent X-ray radiography and X-ray CT from being portable, such as being used to test materials in the environments in which they are used. Moreover, X-ray radiography and X-ray CT may be relatively time consuming.

In contrast, a voltage measurement utilizes relatively smaller, relatively less expensive equipment. As such, the equipment may enable portable crack detection systems, which may be used to detect cracks in materials in situ rather than requiring removing the materials to be tested to the testing equipment.

FIG. 1 is conceptual and schematic diagram block illustrating an example system 10 for determining presence of a crack or other defect in a material 16 based on temperature-corrected electrode pair values. The system 10 of FIG. 1 includes a computing device 12, an electrical signal source 14, a plurality of electrodes 18A-18L (collectively, "electrodes 18"), a switch network 20, and an optional reference electrode 22. Electrodes 18 are electrically coupled to material 16, which is being tested using a four-point voltage measurement.

Material 16 may be any material for which detection of a potential crack or other defect is desired. In some examples, material 16 may be an electrically conductive or an electrically semiconductive material. For example, material 16 may include a metal, an alloy, a metalloid, a semiconductor, an electrically conductive or semiconductive ceramic, or the like. In some examples, material 16 may include a ceramic such as boron carbide ($B_4C$), silicon carbide (SiC), alumina ($Al_2O_3$), composites thereof, or the like.

Material 16 may be used in any one of a wide variety of applications. For example, material 16 may be a ceramic that has relatively high hardness, a relatively high Young's modulus, a relatively high tensile strength, and may be used in ceramic armor plating. Ceramic armor plating may be used in body armor for military and police personnel, vehicle armor, or the like. Example materials for ceramic armor plating include boron carbide ($B_4C$), silicon carbide (SiC), alumina ($Al_2O_3$), composites thereof, or the like.

Material 16 may define any geometry, and the geometry of material 16 may be based at least in part on the intended use for material 16. For example, ceramic armor plating may have a geometry defined by the surface that the armor plating will be applied to. Example geometries for material 16 include, but are not limited to, polygonal solids, such as rectangular solids or solids with more sides.

Electrical signal source 14 may include any device configured to output an electrical signal to electrodes 18. The electrical signal may include an alternating current (AC) signal or a direct current (DC) signal. In some examples, electrical signal source 14 may output a current signal; in other examples, electrical signal source 14 may output a voltage signal. In some examples, electrical signal source 14 may include a power source, such as a battery, a capacitor, a supercapacitor, a transformer electrically connected to a mains voltage, or the like. In some examples, in addition to the power source, electrical signal source 14 may include analog or digital circuitry configured to receive the electrical signal from the power source and modify the electrical signal into a format suitable for output to electrodes 18.

Switch network 20 includes a plurality of inputs and a plurality of outputs, with respective inputs electrically coupled to each respective output by the network of switches. For example, switch network 20 may include a pair of inputs electrically coupled to electrical signal source 14, and at least a pair of inputs electrically coupled to computing device 32. Switch network 20 may include at least as many outputs are there are electrodes 18 and 22. For example, in the example shown in FIG. 1, system 10 includes thirteen electrodes, and switch network 20 thus includes at least thirteen outputs. Each electrode of electrodes 18 and reference electrode 22 is electrically coupled to a respective output of switch network 20.

Electrodes 18 include a plurality of electrodes electrically coupled to material 16. In some examples, as shown in FIG. 1, each electrode of electrodes 18 is also electrically coupled to switch network 20. Each of electrodes 18 may be electrically connected to material 16 using any suitable type of electrical coupling, including, for example, an electrically conductive adhesive, an electrically conductive solder, embedding electrodes 18 in material 16, a dielectric coupling via capacitive coupling, or the like.

Electrodes 18 may be attached to any surface of material 16. The surface to which electrodes 18 are attached may affect the direction in which the electrical field extends and current flows within material 16. Cracks or other defects may affect the magnitude of the voltage more significantly when the electrical field and current flow extends across a plane of the crack (e.g., normal to a surface of the crack). As such, in some examples, the likely locations of cracks or other defects and the likely orientation of cracks or other defects within material 16 may be predicted based on the use for material 16. In some of these examples, electrodes 18 may then be attached to material 16 so that the electrical field and current flow within material 16 extends substantially normal to a predicted orientation of the crack or other defect.

In some examples, rather than predicting a location of the crack or other defect within material 16 and placing electrodes 18 based on the prediction, electrodes 18 may be attached to more than one surface of material 16. For example, if material 16 is in the shape of a cube, electrodes 18 may be attached to three orthogonal surfaces of the cube. By attaching a respective electrode of electrodes 18 to three orthogonal surfaces, the electrical field and current flow may be caused to extend in one of three orthogonal directions depending on the electrodes 18 through which the electrical signal is applied. This may increase a likelihood that induced the electrical field and current flow will extend within material 16 normal to the plane of any crack in material 16. Other examples are possible for other shapes. In some examples, electrodes 18 are distributed across a surface area of material 16, as shown in FIG. 1. In other examples, electrodes 18 are distributed around a perimeter of material 16. In some examples, plurality of electrodes 18 may be referred to as a set of N electrodes 18.

In some examples, system 10 may optionally include reference electrode 22, which may not be electrically coupled to material 16 and may be used for single-ended voltage measurements between one electrode of plurality of electrodes 18 and reference electrode 22. Reference electrode 22 may be at a selected voltage, such a ground or an offset voltage. In some examples, computing device 12 may use the single-ended voltages in the techniques described herein to determine whether material 16 includes a crack or other defect. In other examples, computing device 12 may determine differential voltages between two electrodes electrically coupled to material 16 comparing (e.g., subtracting) single ended voltages associated with the two electrodes, and computing device 12 may use these differential voltages in the techniques described herein to determine whether material 16 includes a crack or other defect. In still other examples, computing device 12 may determine a voltage between two of electrodes 18 directly, e.g., without first determining two single-ended voltages.

Computing device 12 is configured to control operation of system 10, including electrical signal source 14 and switch network 20. Computing device 12 may include any of a wide range of devices, including computer servers, desktop computers, notebook (i.e., laptop) computers, tablet computers, and the like. In some examples, computing device 12 may include a processor. The processor may include one or more microprocessors, digital signal processors (DSP), application specific integrated circuits (ASIC), field programmable gate arrays (FPGA), or other digital logic circuitry. In some examples, computing device 12 may include an analog-to-digital converter (ADC), or system 10 may include an ADC separate from computing device 12. In examples in which the ADC is separate from computing device 12, the ADC may be electrically coupled between measurement electrode 18C and computing device 12 and between measurement electrode 18D and computing device 12. The ADC may measure the voltage across measurement electrodes 18C and 18D, e.g., under control of computing device 12.

Computing device 12 is communicatively coupled to electrical signal source 14 and electrically coupled to switch network 20, e.g., either directly or indirectly via an external device, such as an ADC. Computing device 12 may be configured to control electrical signal source 14 to output an electrical signal, and may be configured to control switch network 20 to connect a selected pair of electrodes 18 to electrical signal source 14 to serve as a pair of drive electrodes, such that the electrical signal output by electrical signal source 14 is output to the pair of drive electrodes.

Computing device 12 is also configured to cause switch network 20 to connect a selected pair of electrodes 18 or one of electrodes 18 and reference electrode 22 to computing device 12 to serve as a pair of measurement electrodes. In this way, computing device 12 may determine a voltage across a pair of measurement electrodes in response to the electrical signal output by electrical signal source 14.

Figure 2:
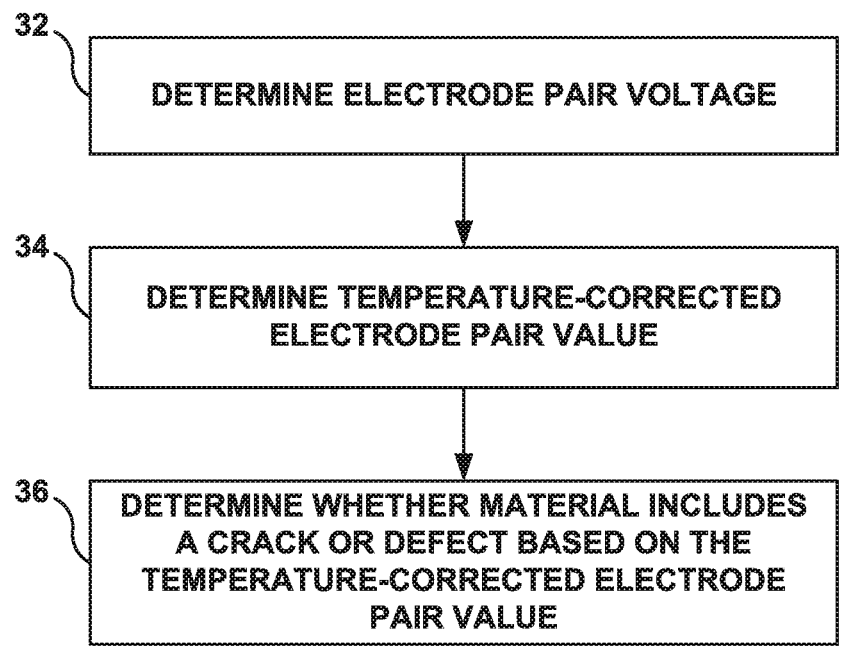
FIG. 2 is a flow diagram illustrating example techniques for determining whether a material includes a crack or other defect based on temperature-corrected electrode pair values.

Further example operation of system 10 of FIG. 1 will be described with reference to the flow diagrams shown in FIG. 2. FIG. 2 is a flow diagram illustrating an example technique for determining whether a material includes a crack or other defect based on temperature-corrected electrode pair values. The technique of FIG. 2 will be described with concurrent reference to system 10 of FIG. 1, but it will be understood that other systems that include more or fewer components than system 10 may perform the technique of FIG. 2 (e.g., a system that includes only computing device 12), and that system 10 may be used to perform other techniques (e.g., the techniques of FIGS. 5, 6, and 9 among other techniques).

The technique of FIG. 2 may include determining, by computing device 12, for at least one adjacent pair of electrodes of electrodes 18, an electrode pair voltage (32). Computing device 12 may determine the electrode pair voltage using any one of a variety of techniques. For example, computing device 12 may determine one or more voltages using electrical signal source 14 and electrodes 18 (and optionally reference electrode 22). Computing device 12 may cause switch network 20 to electrically couple a pair of electrodes 18 to electrical signal source 14 as a pair of drive electrodes 18. Computing device 12 then may cause electrical signal source 14 to output an electrical signal, such as a current signal or a voltage signal, which is conducted across material 16 between the pair of drive electrodes 18.

Computing device 12 also may cause switch network 20 to electrically couple a pair of electrodes to computing device 12 (or another device, such as an ADC) to be a pair of measurement electrodes. As described above, in some examples, the pair of measurement electrodes may include two of electrodes 18, each of which is not a drive electrode. The two of electrodes 18 may be physically adjacent to each other on material 16, and the electrode pair voltage may be the measured voltage.

In other examples, the pair of measurement electrodes may include reference electrode 22 and one of electrodes 18. In examples in which the pair of measurement electrodes includes reference electrode 22 and one of electrodes 18, computing device 12 may determine a first measurement voltage between reference electrode 22 and a first one of electrodes 18 and then may cause switch network 20 to electrically couple a second one of electrodes 18 to computing device 12. Computing device 12 then may measure a second measurement voltage between reference electrode 22 and the second one of electrodes 18. Computing device 12 then may determine the electrode pair voltage as the difference between the first measured voltage and the second measured voltage, or as the absolute value of the difference between the first measured voltage and the second measured voltage.

In either implementation, computing device 12 may determine a voltage between the measurement electrodes while electrical signal source 14 is applying the electrical signal to material 16 via the pair of drive electrodes. The measured voltage may be the electrode pair voltage or computing device 12 may use the measured voltage to determine the electrode pair voltage.

In other examples, rather than measuring one or more voltages and determining the electrode pair voltage based on the one or more measured voltages, computing device 12 may receive one or more measured voltages from another device or system, and may determine the electrode pair voltage based on the received one or more measured voltages. For example, another system, remote from computing device 12 may be used to measure voltages, and may communicate the measured voltages to computing device 12. Computing device 12 then may determine the at least one electrode pair voltages based on the received one or more measured voltages. Similar to the above example, the one or more measured voltages may be single-ended voltages measured using an electrode electrically coupled to a material and a reference electrode, may be a voltage measured using two electrodes electrically coupled to a material, or may be a differential voltage determined as a difference between two single-ended voltages.

In some examples, instead of determining a single electrode pair voltage, computing device 12 may determine at least one respective electrode pair voltage for each of a plurality of electrode pairs. For example, computing device 12 may cause switch network 20 to electrically couple a pair of electrodes 18 to electrical signal source 14 to function as a pair of drive electrodes. While causing electrical signal source 14 to apply an electrical signal across the pair of drive electrodes, computing device 12 may determine a respective measured voltage for each of a plurality of pairs of measurement electrodes. As described above, each pair of measurement electrodes may include at least one of electrodes 18, e.g., two of electrodes 18 or reference electrode and one of electrodes 18. Computing device 12 may determine a respective measured voltage for each of a plurality of pairs of measurement electrodes, and, in some examples, each of electrodes 18 that is not connected to electrical signal source 14 as a drive electrode may be included in at least one of the pairs of measurement electrodes. Computing device 12 then may determine, based on the measured voltages, respective electrode pair voltages for each pair of adjacent electrodes from electrodes 18 that are not the drive electrodes.

In some examples, after determining the respective measured voltage for each of the plurality of pairs of measurement electrodes, computing device 12 then may cause switch network 20 to connect a different pair of electrodes to electrical signal source 14 to function as a pair of drive electrodes. While causing electrical signal source 14 to apply an electrical signal across the pair of drive electrodes, computing device 12 may determine a respective measured voltage for each of a plurality of pairs of measurement electrodes as described above. Computing device 12 then may determine, based on the measured voltages, respective electrode pair voltages for each pair of adjacent electrodes from electrodes 18 that are not the drive electrodes. In some examples, computing device 12 may repeat this for each of a plurality of pairs of drive electrodes.

The technique of FIG. 2 also includes determining, by computing device 12, a temperature-corrected electrode pair value (34). In some examples, computing device 12 may utilize a temperature correction factor and an electrode pair voltage to determine the temperature-corrected electrode pair value. In such examples, the temperature-corrected electrode pair value may be a temperature-corrected electrode pair voltage. The temperature correction factor may be used to effectively scale a voltage measurement at one temperature to be approximately equivalent to a voltage at another temperature. As such, the temperature correction factor may be based on differences in conductivity of material 16 as a function of temperature.

The temperature correction factor may be based on theoretical calculations or experimental data. For example, the temperature correction factor may be based on a plurality of measurements of voltages between pairs of electrodes 18 at each of a plurality of different temperatures. The relationship between the measured voltages and the measurement temperature may be used to determine the temperature correction factor, e.g., by determining a ratio between a measured voltage at a first temperature and a measured voltage at a second temperature. The second temperature may be a selected standard temperature, e.g., room temperature, such that applying the appropriate temperature correction factor to any measured voltage (e.g., multiplying the temperature correction factor and the measured voltage) scales the measured voltage to an approximately equivalent voltage at the standard temperature. In some examples, the respective temperature correction factors and the associated temperatures may be stored in a look up table or other data structure and computing device 12 may retrieve a selected temperature correction factor from the look up table or other data structure based on a temperature at which the measured voltages were measured. In other examples, an equation (such as a polynomial equation) may be used to represent the relationship between the temperature correction factor, and computing device 12 may determine the temperature correction factor by inputting the temperature at which the measured voltages were measured into the equation and calculating the temperature correction factor. Computing device 12 then may apply the temperature correction factor to each respective electrode pair voltage (e.g., by multiplying the temperature correction factor and the respective electrode pair voltages).

In some examples, in addition to or as alternative to using a temperature correction factor, computing device 12 may determine the temperature-corrected electrode pair value (34) utilizing a control voltage. In such cases, the temperature-corrected electrode pair value may be a ratio of voltages. The control voltage may be based on material 16, a model, or an average of a plurality of materials that are similar to or substantially the same as material 16. For example, computing device 12 or another similar computing device may determine the control voltage at a time at which material 16 is manufactured, or a time at which an independent measurement (e.g., X-ray radiology or X-ray CT scan) may be used to verify that material 16 is intact, undamaged, or does not include a crack. Computing device 12 or the other similar computing device may determine by control voltage by applying the electrical signal to a pair of drive electrodes from electrodes 18 and determining the voltage across a plurality of pairs of measurement electrodes. In some examples, the control voltages may be determined using similar or substantially the same combinations of pairs of drive electrodes and pairs of measurement electrodes as are used to determine the measurement voltages described above. The control voltages then may be the measured voltages (e.g., if pairs of electrodes 18 are used as pairs of measurement electrodes), may be differences between measured voltages (e.g., if reference electrode 22 and one of electrodes is used as a pair of measurement electrodes), or the like.

In other examples, the control voltage may be determined using a model of the material in an intact (undamaged) state. For example, computing device 12 may execute the model of material 16 and determine the control voltage based on the model. In some examples, the model may include a physics-based model of the electrical properties of material 16. In some other examples, the control voltage may be determined as an average (e.g., mean) of a plurality of similar materials (e.g., in geometry and composition) that are known to be intact (undamaged). This control voltage may be stored (e.g., in a memory device associated with computing device 12) for later use.

Computing device 12 may determine a ratio between a respective electrode pair voltage and a respective control voltage associated with the same pair of electrodes. In some examples, multiple electrode pair voltages may be associated with the same pair of adjacent electrodes from electrodes 18, e.g., due to multiple measurements with different pairs of drive electrodes. In such examples, computing device 12 may determine a ratio between each respective electrode pair voltage and the respective control voltage associated with the same pair of electrodes. By determining a ratio between the measured voltage and the control voltage, effects of temperature differences in the material between the time at which the control voltage was determined and the electrode pair voltage was determined may be reduced.

In some examples, computing device 12 may utilize both a temperature correction factor and a ratio between electrode pair voltage and a corresponding control voltage to determine a temperature-corrected electrode pair value (34). For example, computing device 12 may apply to each respective electrode pair voltage a temperature correction factor based on the temperature of material 16 at the time at which the measurement voltages used to determine the respective electrode pair voltages were measured. In some examples, the temperature correction factor may referenced to a temperature substantially equal to the temperature of material 16 at the time at which the measurement voltages used to determine the respective control voltages were measured. In other examples, computing device 12 may apply to each respective control voltage a temperature correction factor based on the temperature of material 16 at the time at which the measurement voltages used to determine the respective control voltages were measured.

In either case, computing device 12 then may determine a respective ratio between a respective electrode pair voltage (corrected by the temperature correction factor) and a respective control voltage (optionally corrected by the temperature correction factor) associated with the same pair of electrodes. The resulting ratios may represent temperature-corrected electrode pair values.

Once computing device 12 has determined at least one temperature-corrected electrode pair value (34), the number of which may depend on the number of adjacent pairs of electrodes attached to material 16 or selected for use in evaluating material 16, computing device 12 may determine whether material 16 includes a crack or other defect based on the temperature-corrected electrode pair value or the plurality of respective temperature-corrected electrode pair values (36). Computing device 12 may utilize the temperature-corrected electrode pair value(s) in one of a variety of techniques to determine whether material 16 includes a crack or other defect.

For example, computing device 12 may utilize pattern recognition. In some examples, for each pair of adjacent electrodes, computing device 12 may sum all temperature-corrected electrode pair values associated with the respective pair of adjacent electrodes. Computing device 12 may then determine whether any adjacent pairs of adjacent electrodes are associated with sums that follow a predetermined pattern, such as a low-high-low pattern, a low-high-high-high-low pattern, or the like. The particular pattern that indicates that material 16 includes a crack or other defect may depend on positioning of electrodes 18, including spacing between adjacent electrodes of electrodes 18; crack location and orientation within material 16; and the like. In other examples, computing device 12 may use pattern recognition on each set of electrode pair voltages associated a respective pair of drive electrodes, and may compare the results of the various pattern recognitions to arrive at a final determination of whether material 16 includes a crack or other defect.

Figure 3:
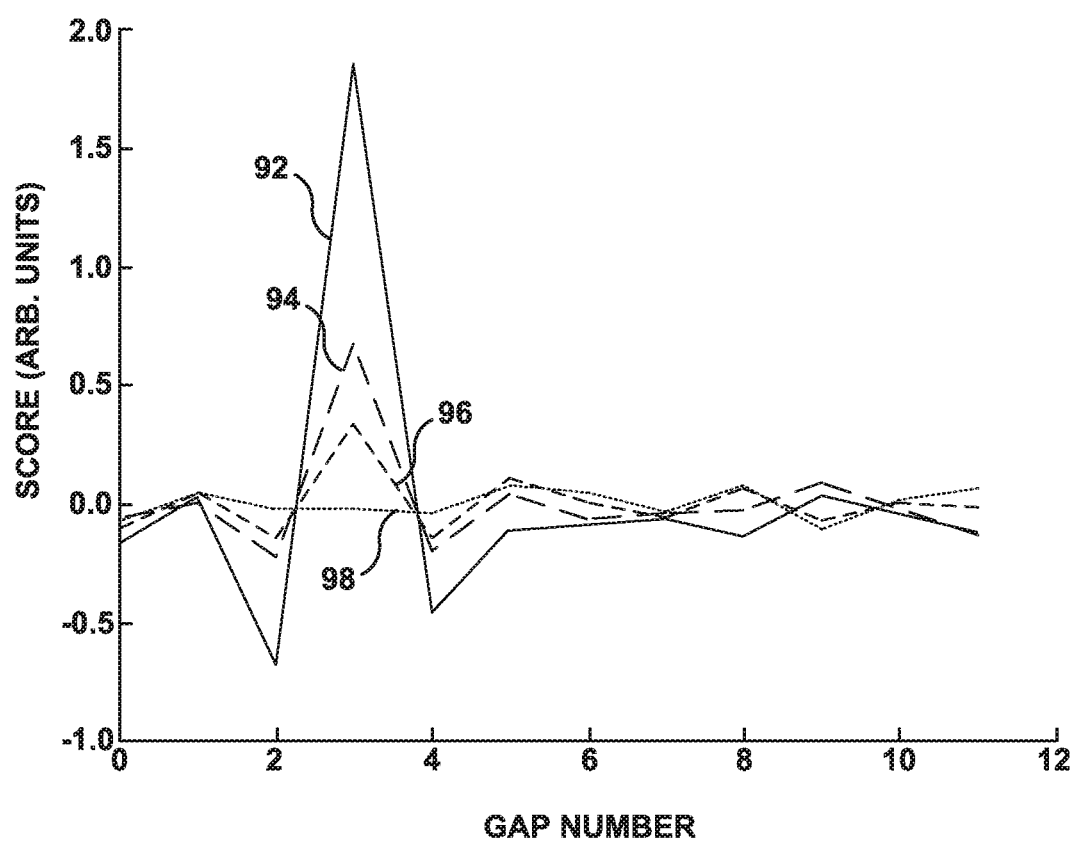
FIG. 3 is a diagram illustrating an example plot of score versus electrode gap number.

FIG. 3 is a diagram illustrating another example plot of score versus electrode gap number. In some examples, the score referenced in FIG. 3 is the sum referred to above. In other examples, the score may be the temperature-corrected electrode pair value, such as a ratio of voltages or a temperature-corrected electrode pair voltage. The gap number may be a label for a pair of adjacent electrodes. For example, if electrodes 18 are distributed around a perimeter of material 16, the pairs of adjacent electrodes may be labeled with sequentially increasing numbers proceeding clockwise or counterclockwise around the perimeter of material 16.

In the example shown in FIG. 3, the line 98 represents the control voltages associated with each respective gap number, and is substantially the same for each respective gap number. Each other line represents temperature-corrected voltage pair values based on measured voltages determined at a respective temperature (and then divided by a respective control voltage). For example, the curve 94 represents temperature-corrected voltage pair values based on measured voltages determined at room temperature, the curve 96 represents temperature-corrected voltage pair values based on measured voltages determined at about 60° C., and the curve 92 represents temperature-corrected voltage pair values based on measured voltages determined at about −28° C. In each instance of FIG. 3, the pattern associated with gap numbers 2 (e.g., the second pair of adjacent electrodes), 3

(e.g., the third pair of adjacent electrodes), and 4 (e.g., the fourth pair of adjacent electrodes) follow a low-high-low pattern that indicates that material 16 includes a crack or other defect, which may be located at gap number 3.

As another example, computing device 12 may determine whether material 16 includes a crack or other defect by determining whether any of the electrode pair voltages, or the sum of electrode pair voltages, associated with a single pair of adjacent electrodes, is an outlier compared to electrode pair voltages, or sums of electrode pair voltages, associated with other pairs of adjacent electrodes. Cracks or other defects are expected to create regions of higher electrical resistance in material 16, which is expected to result in higher voltages being measured for electrode pairs in which current will flow across or through regions of higher electrical resistance. Hence, an outlier of higher temperature-corrected electrode pair values indicates that material 16 includes a crack or other defect.

Figure 4:
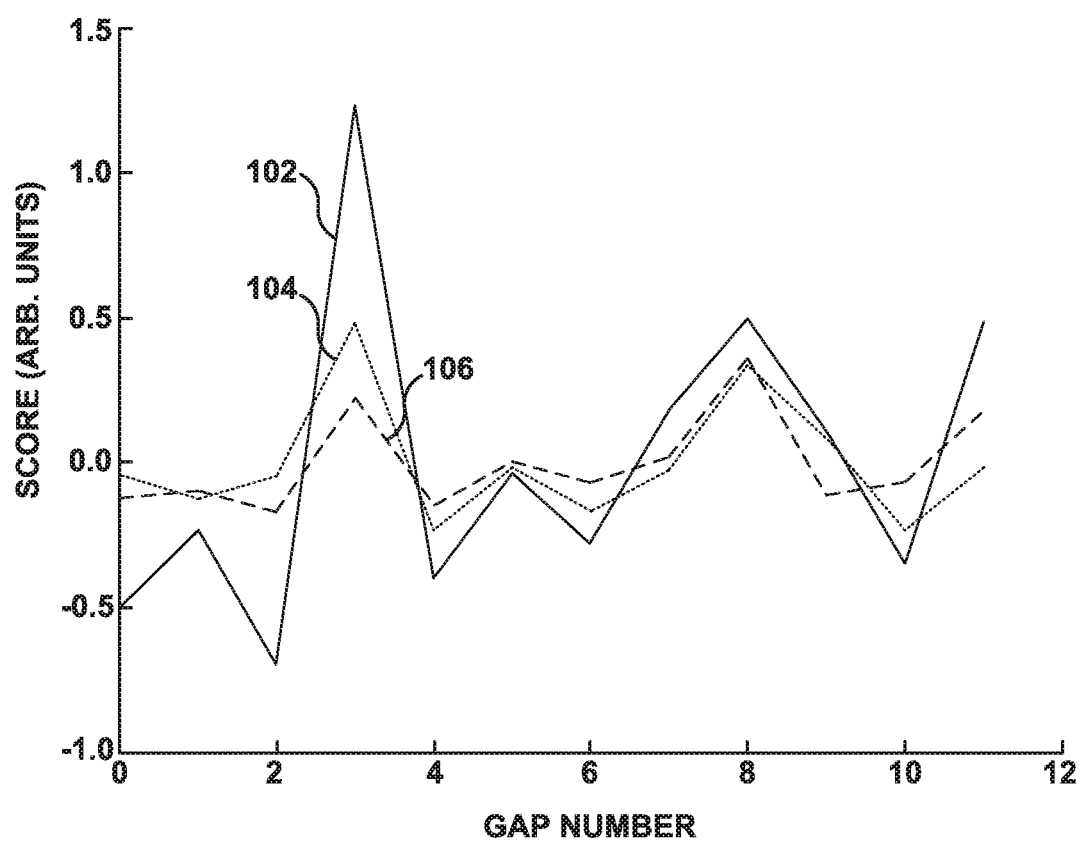
FIG. 4 is a diagram illustrating another example plot of score versus electrode gap number.

FIG. 4 is a diagram illustrating another example plot of score versus electrode gap number. in some examples, the score referenced in FIG. 4 is the sum referred to above. In other examples, the score may be the temperature-corrected electrode pair value, such as a ratio of voltages or a temperature-corrected electrode pair voltage. The gap number may be a label for a pair of adjacent electrodes. For example, if electrodes 18 are distributed around a perimeter of material 16, the pairs of adjacent electrodes may be labeled with sequentially increasing numbers proceeding clockwise or counterclockwise around the perimeter of material 16.

In the example shown in FIG. 4, each line represents temperature-corrected voltage pair values based on measured voltages determined at a respective temperature. For example, the curve 104 represents temperature-corrected voltage pair values based on measured voltages determined at room temperature, the curve 106 represents temperature-corrected voltage pair values based on measured voltages determined at about 60° C., and the curve 102 represents temperature-corrected voltage pair values based on measured voltages determined at about –28° C. In each instance of FIG. 4, the score associated with gap number 3 (e.g., the third pair of adjacent electrodes), the score associated with gap number 8 (e.g., the eighth pair of adjacent electrodes), and the score associated with gap number 11 (e.g., the eleventh pair of adjacent electrodes) are outliers, and indicate that material 16 includes a crack or other defect.

As a further example, computing device 12 may determine whether material 16 includes a crack or other defect by determining an overall score for material 16. For example, computing device 12 may sum all temperature-corrected electrode pair values associated with the respective pair of adjacent electrodes to generate a single value associated with each respective pair of adjacent electrodes. Computing device 12 then may mathematically manipulate these values to arrive at a single score for material 16. For example, computing device 12 may sum the values, take each value to a predetermined power and sum the products, average the values, determine a weighted average of the values, or the like to determine a single score for material 16. Computing device 16 then may compare the single score to a threshold score value and determine that material 16 includes a crack or other defect if the single score is greater than the threshold score value.

By using a four-point voltage measurement and determining a temperature-corrected electrode pair value, contributions of temperature changes in material 16, the electrical leads coupling the pair of measurement electrodes to computing device 12 and any contact resistance between one or both of the measurement electrodes and material 16 may be reduced or substantially eliminated. Hence, a four-point voltage measurement and determining a temperature-corrected electrode pair value may facilitate measurement of voltages in material 16 and detection of cracks due to changes in electrical properties, such as resistivity, conductivity, or other related electrical properties.

In this way, using a four-point voltage measurement and determining a temperature-corrected electrode pair value may offer improved accuracy and sensitivity for detecting cracks or other defects in material 16 compared to a two-point voltage measurement or not accounting for the temperature of material 16 when the voltages were measured. Additionally, a system 10 may offer improved portability and cost compared to an X-ray radiography or X-ray computed tomography system, while offering sufficient accuracy and detail to enable detection of cracks or other defects in material 16 while material 16 is being used in the field.

Figure 5:
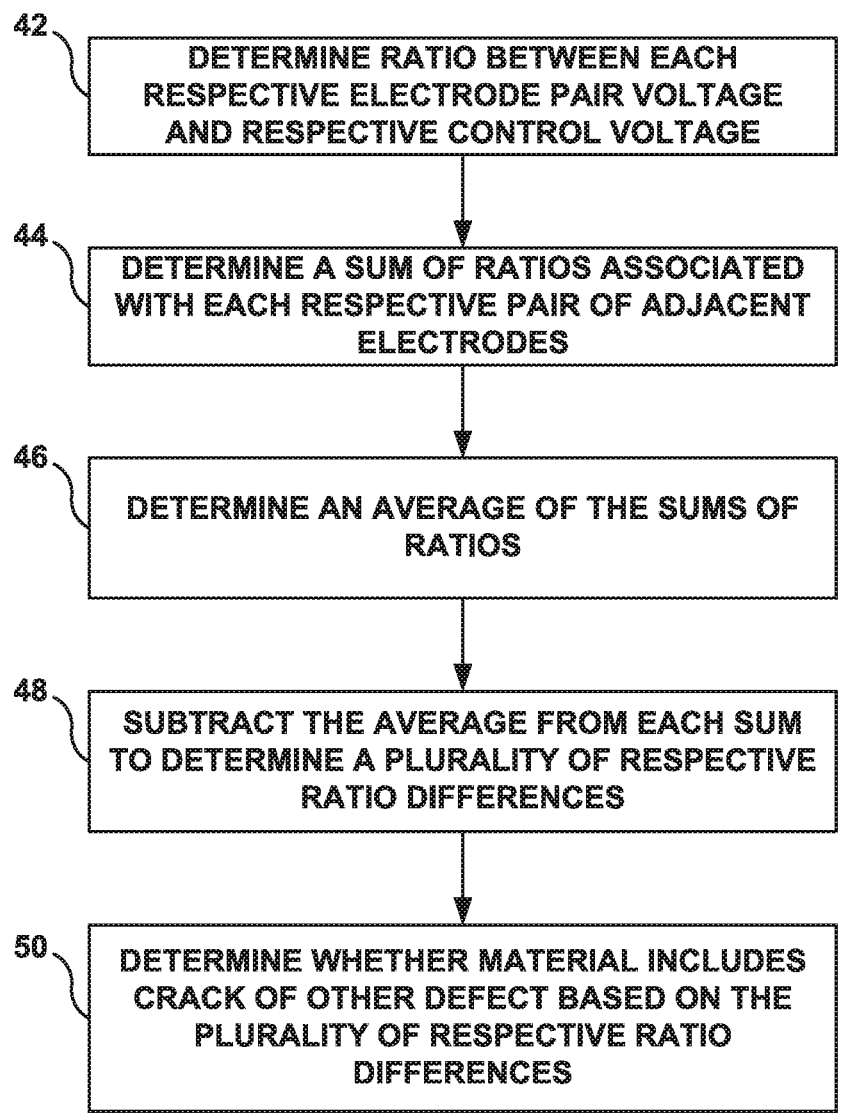
FIGS. 5 and 6 are flow diagrams illustrating example techniques for determining whether a material includes a crack or other defect based on temperature-corrected electrode pair values.

FIG. 5 is a flow diagram illustrating another example of determining whether material 16 includes a crack or other defect based on a temperature-corrected electrode pair value. FIG. 5 illustrates further details of some examples for determining a temperature-corrected electrode pair value (34) and determining whether material 16 includes a crack or other defect based on the temperature-corrected electrode pair value (36), in which the temperature-corrected electrode pair value is a voltage ratio. The technique of FIG. 5 will be described with concurrent reference to system 10 of FIG. 1, but it will be understood that other systems that include more or fewer components than system 10 may perform the technique of FIG. 5 (e.g., a system that includes only computing device 12), and that system 10 may be used to perform other techniques (e.g., the techniques of FIGS. 2, 6, and 9, among other techniques).

The technique of FIG. 5 includes determining, by computing device 12, a ratio between electrode pair voltage of a plurality of electrode pair voltages and a respective control voltage (42). The respective electrode pair voltage and the respective control voltage are associated with the same pair of adjacent electrodes. Each of the respective electrode pair voltages and the respective control voltages may have been previously determined as described above with reference to FIGS. 1 and 2.

The technique of FIG. 5 also optionally includes determining, by computing device 12, a sum of the respective voltage ratios associated with each respective pair of adjacent electrodes (44). For example, as described above, each respective pair of adjacent electrodes may have a plurality of associated electrode pair voltages, as computing device 12 may have determined electrode pair voltages for the respective pair of adjacent electrodes for each of a plurality of pairs of drive electrodes. Hence, in examples in which each respective pair of adjacent electrodes is associated with a respective plurality of electrode pair voltages, each respective pair of adjacent electrodes is then associated with a respective plurality of ratios. To determine a single value for each respective pair of adjacent electrodes, computing device 12 may sum the respective plurality of ratios associated with the respective pair of adjacent electrodes.

Computing device 12 then may determine an average of the sums of the ratios (46), e.g., by summing the respective sums of the ratios, then dividing the sum of the sums by the number of pairs of adjacent electrodes. Computing device 12 may subtract the average of the sums of the ratios from the respective sums of the ratios to determine a plurality of respective ratio differences (48). The ratio differences may also be referred to residual ratios. A respective ratio difference is associated with each pair of adjacent electrodes. The process of determining the average of the sums of the ratios (46) and subtracting the average of the sums of the ratios from the respective sums of the ratios may be referred to as de-trending or de-averaging.

In some examples, rather than de-averaging, computing device 12 may subject the sums of the ratios to a linear de-trending. In a linear de-trending, computing device 12 may fit a linear curve (e.g., a line of y=mx+b) to the set of sums of the ratios as a function of position or pair of adjacent electrodes.

Regardless of the technique used to de-trend the sums of the ratios, computing device 12 may utilize the de-trended sums of the ratios (e.g., the plurality of respective residual ratios or the plurality of respective ratio differences) to determine whether material 16 includes a crack or other defect (50). For example, computing device 12 may utilize pattern recognition, identify at least one outlier, or mathematically manipulate the plurality of respective ratio differences as described above in FIG. 2 to determine whether material 16 includes a crack or other defect (50).

Figure 6:
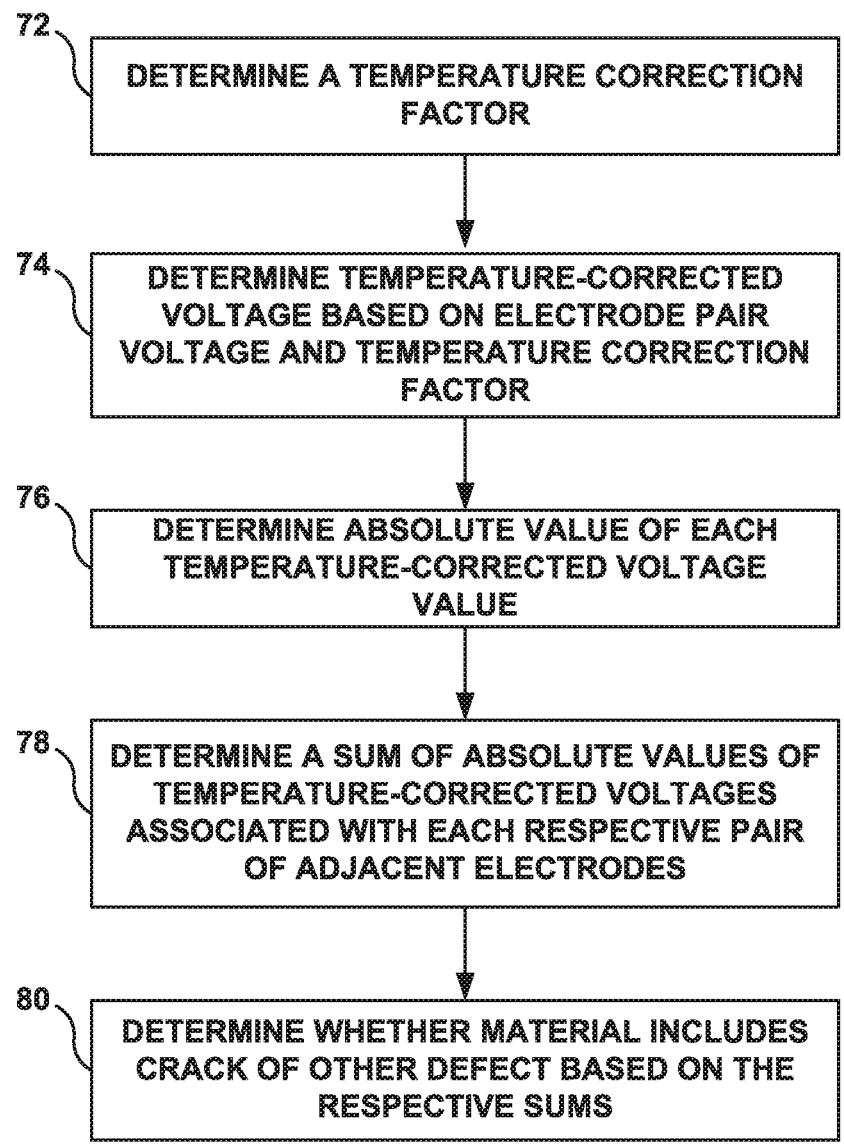

FIG. 6 is a flow diagram illustrating another example of determining whether material 16 includes a crack or other defect based on a temperature-corrected electrode pair value. FIG. 6 illustrates further details of some examples for determining a temperature-corrected electrode pair value (34) and determining whether material 16 includes a crack or other defect based on the temperature-corrected electrode pair value (36), in which the temperature-corrected electrode pair value is a temperature-corrected electrode pair voltage. The technique of FIG. 6 will be described with concurrent reference to system 10 of FIG. 1, but it will be understood that other systems that include more or fewer components than system 10 may perform the technique of FIG. 6 (e.g., a system that includes only computing device 12), and that system 10 may be used to perform other techniques (e.g., the techniques of FIGS. 2, 5, and 9, among other techniques).

The technique of FIG. 6 includes determining, by computing device 12, a temperature correction factor (72). As described above, computing device 12 may determine the temperature correction factor by retrieving the temperature correction factor from a look up table based on the temperature at which the measured voltages used to determine the electrode pair voltages were measured, or may determine temperature correction factor by using the temperature at which the measured voltages used to determine the electrode pair voltages were measured as an input to an equation relating temperature to temperature correction factor. The data in the look up table or the equation may be based on theoretical or experimental relationships between temperature and measured voltage, as described above.

The technique of FIG. 6 also includes determining, by computing device 12, respective temperature corrected electrode pair voltages based on respective electrode pair voltage values and the temperature correction factor (74). For example, computing device 12 may multiply the temperature correction factor by each respective electrode pair voltage value to determine the respective temperature corrected electrode pair voltage. Computing device 12 then may determine the absolute value of each temperature-corrected electrode pair voltage (76).

The technique of FIG. 6 also includes determining, by computing device 12, for each respective pair of adjacent electrodes, a respective sum of the absolute values of the temperature-corrected voltages associated with the respective pair of adjacent electrodes (78). For example, as described above, each respective pair of adjacent electrodes may have a plurality of associated electrode pair voltages, as computing device 12 may have determined electrode pair voltages for the respective pair of adjacent electrodes for each of a plurality of pairs of drive electrodes. Hence, in examples in which each respective pair of adjacent electrodes is associated with a respective plurality of electrode pair voltages, each respective pair of adjacent electrodes is then associated with a respective plurality of temperature-corrected electrode pair voltages. To determine a single value for each respective pair of adjacent electrodes, computing device 12 may sum the respective plurality of temperature-corrected electrode pair voltages associated with the respective pair of adjacent electrodes.

Computing device 12 then may determine whether material 16 includes a crack or other defect based on the respective sums of the temperature-corrected electrode pair voltages (80). For example, computing device 12 may utilize pattern recognition, identify at least one outlier, or mathematically manipulate the plurality of respective ratio differences as described above in FIG. 2 to determine whether material 16 includes a crack or other defect (80).

In some examples, computing device 12 may implement aspects of the techniques of FIGS. 5 and 6 in a single technique. For example, after determining for each respective pair of adjacent electrodes, a respective sum of the absolute values of the temperature-corrected voltages associated with the respective pair of adjacent electrodes (78), computing device 12 may de-trend the respective sums of the absolute values of the temperature-corrected voltages using the de-trending (e.g., de-averaging or linear detrending) techniques described with reference to FIG. 5. As another example, computing device 12 may determine a first temperature correction factor (72) for the electrode pair voltages and, optionally, determine a second temperature correction factor for the control voltages in the technique of FIG. 5. Computing device 12 then may determine temperature-corrected electrode pair voltages and, optionally, temperature-corrected control voltages, and may use the temperature-corrected electrode pair voltages and, optionally, temperature-corrected control voltages to determine the respective ratios (42). Other combinations of the techniques described in FIGS. 5 and 6 are also possible.

In some examples, the effect of temperature on conductivity of material 16 may be more complex than a single temperature coefficient can represent, and the ratios or temperature-correction factors may not account for all variability of conductivity in material 16. For example, a single piece of material 16 may include different crystal structures or grain sizes within material, resulting in a non-uniform temperature coefficient within material 16. In addition, material 16 may be used in applications, such as armor, where material 16 is used in combination with other materials. Therefore, there is a chance that material 16 cannot be completely isolated such that the voltage measurement represents only behavior of material 16. These effects are referred to as 'secondary' effects and are typically small, but the system may be improved by more advanced calibration techniques.

For example, computing device 12 may measure voltages, e.g., using at least one pair of drive electrodes and a plurality of pairs of measurement voltages, at each of a plurality of temperatures at a time at which material 16 is known to be intact. Computing device 12 may determine electrode pair voltages based on the measured voltages, as described above. Computing device 12 then may determine a single score for each set of measurements based on the electrode pair voltages. For example, computing device 12 may sum the electrode pair voltages associated with respective pairs of adjacent electrodes to determine a single score for each pair of adjacent electrodes, and them may combine these respective single scores into one score for the set of measurements. Computing device 12 may sum the respective single scores to arrive at the one score, may take each of the respective single scores to a predetermined power, such as a square, cube, or the like and sum the products to arrive at the one score, or the like.

Figure 7:
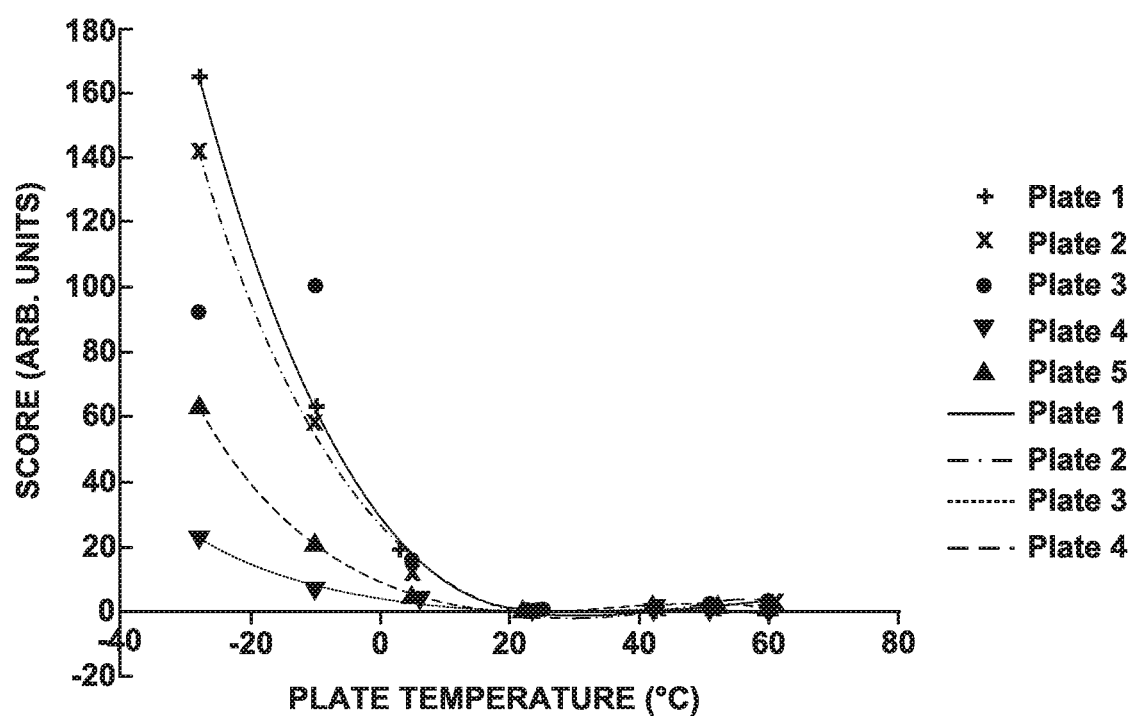
FIG. 7 is a diagram illustrating an example plot of score versus plate temperature.

Computing device 12 then fit a curve to the scores as a function of temperature. FIG. 7 is a diagram illustrating an example plot of score versus plate temperature for each of five plates. In FIG. 7, four out of five of the plates (Plates 1, 2, 4, and 5) have temperature dependent scores which can be modeled via a polynomial fit, such as a third-order polynomial fit.

In some examples, for a given composition of material 16, each sample of material 16 may have a conductivity that changes as a function of temperature in substantially the same manner; thus, in some examples, a single equation may be used to represent the score versus temperature for all samples of material 16 having the same composition. In other examples, even if the composition is the same, different samples of material 16 may have a conductivity that changes as a function of temperature in a different manner; thus, in some examples, computing device 12 may determine a different curve or equation for each sample of material 16. In some examples in which a different curve or equation is used for each sample of material, computing device 12 may determine the curve or equation at the time at which the computing device 12 determines the control voltages, e.g., by taking separate measurements when material 16 is heated to each of a plurality of predetermined temperatures. For example, in the data shown in FIG. 7, each sample of material 16 has a different response to changes in temperature, so a different curve may be determined and used for each sample of material 16.

In some examples in which computing device 12 determines whether material 16 includes a crack or other defect by comparing a value to a threshold value, e.g., by comparing a temperature-corrected electrode pair value difference or a score to a threshold score, computing device 12 may determine the threshold score or value based on a score versus temperature curve or equation. For example, computing device 12 may receive or determine a temperature at which the voltages used to determine the electrode pair voltages were measured, and may determine a score by inputting the temperature into the equation or looking up a score based on the temperature. Computing device 12 may then determine the threshold score or value by adding a predetermined offset to the determined score, e.g., 10, 20, or 30 points in the example shown in FIG. 7.

Figure 8:
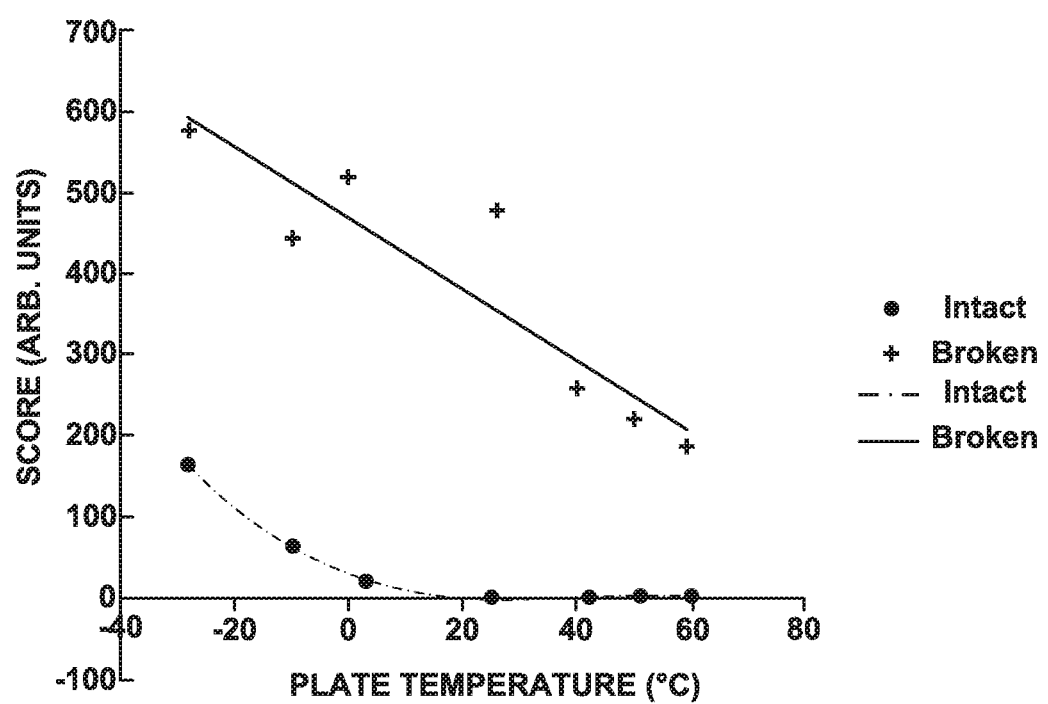
FIG. 8 is a diagram illustrating another example plot of score versus plate temperature.

FIG. 8 is a diagram illustrating another example plot of score versus plate temperature. The data in FIG. 8 illustrates scores for a broken material 16 and an unbroken material 16. As shown in FIG. 8, the broken hot score is similar to the unbroken cold score and with a constant threshold could be difficult to distinguish. However, at each temperature, there is clearly separation between broken and unbroken states. Thus, if the temperature is known, computing device 12 may set an appropriate threshold. For example, computing device 12 may add a constant 10 to the unbroken polynomial fit to determine the threshold value. In this way, in some examples, in addition to determining a temperature-corrected electrode pair value, computing device 12 may additionally determine a threshold based on a temperature of material 16. This may further account for differences in conductivity of material 16 as a function of temperature and may allow more accurate determinations of whether material 16 includes a crack or other defect.

Figure 9:
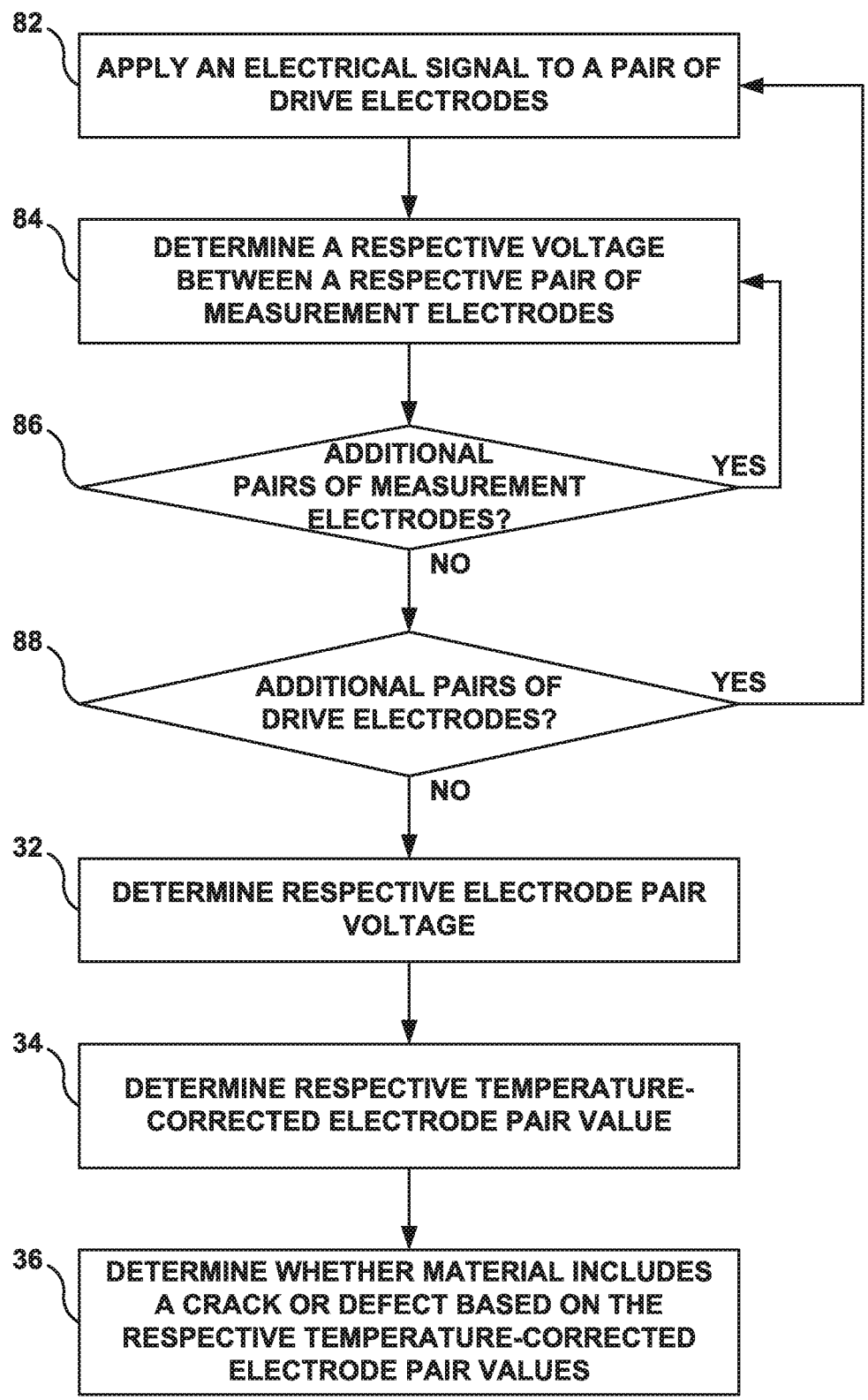
FIG. 9 is a flow diagram illustrating example techniques for determining whether a material includes a crack or other defect based on temperature-corrected electrode pair values.

FIG. 9 is a flow diagram illustrating another example of determining whether material 16 includes a crack or other defect based on a temperature-corrected electrode pair value. FIG. 9 illustrates further details of some examples for determining measurement voltages for use in determining electrode pair voltages. The technique of FIG. 9 will be described with concurrent reference to system 10 of FIG. 1, but it will be understood that other systems that include more or fewer components than system 10 may perform the technique of FIG. 9, and that system 10 may be used to perform other techniques (e.g., the techniques of FIGS. 2, 5, and 6, among other techniques).

The technique of FIG. 9 includes applying an electrical signal to a first pair of drive electrodes electrically coupled to material 16 (82). For example, computing device 12 may cause switch network 20 to electrically couple electrical signal source 14 to a selected pair of electrodes 18, which serves as a pair of drive electrodes. The selected pair of electrodes 18 may include any two electrodes of electrodes 18. In some examples, the selected pair of electrodes 18 may be adjacent to each other; in other examples, the selected pair of electrodes may be spaced apart. For example, in some instances, the selected pair of electrodes 18 may be substantially opposite each other in the array of electrodes, e.g., electrode 18A and electrode 18L or electrode 18F and electrode 18G, or may be separate by a predetermined number of electrodes 18, e.g., separated by two electrodes of electrodes 18.

Computing device 12 then may cause electrical signal source 14 to apply the electrical signal to the first pair of drive electrodes electrically coupled to material 16 (82), e.g., via switch network 20. The electrical signal may include an AC signal or a DC signal, and may include a current signal or a voltage signal. In some examples, the type of electrical signal may depend on the composition of material 16. For example, a DC signal may be used to measure a voltage of an electrically conductive or electrically semiconductive material, while an AC signal may be used to measure a voltage of an electrically conductive material, an electrically semiconductive material, or a dielectric material. Computing device 12 also may control electrical signal source 14 to generate the predetermined electrical signal with a selected amplitude, duration, frequency, and other signal characteristics.

The technique of FIG. 9 also includes, while applying the electrical signal to the first pair of drive electrodes, determining a voltage between a pair of measurement electrodes, at least one of which is electrically coupled to material 16 (84). For example, computing device 12 may cause switch network 20 to electrically couple computing device 12 to a selected pair of measurement electrodes. The selected pair of measurement electrodes may be any two electrodes from electrodes 18, neither of which is being used as one of the electrodes in the drive pair of electrodes, or may be reference electrode 22 and any one of electrodes 18 that is not being used as one of the electrodes in the drive pair of electrodes. In some examples, the two electrodes in the pair of measurement electrodes may be adjacent to each other, e.g., electrode 18B and electrode 18C, or electrode 18D and electrode 18J. In other example, the two electrodes in the pair of measurement electrodes may be spaced each other with one or more electrodes between, e.g., electrode 18B and electrode 18D, or electrode 18E and electrode 18H.

Using adjacent electrodes as the pair of measurement electrodes may result in a higher signal-noise-ratio in the voltage measurement, but may reduce an area of material 16 for which the voltage is measured. Regardless of the particular electrodes coupled to computing device 12, computing device 12 may determine a voltage between the pair of measurement electrodes (84) while electrical signal source 14 is applying the electrical signal to the selected pair of drive electrodes (82).

In some examples, computing device 12 may be configured to determine a respective measurement voltage for a plurality of pairs of measurement electrodes for each pair of drive electrodes. Hence, in some examples, the technique of FIG. 9 further includes determining whether there is an additional pair of measurement electrodes at which to determine a measurement voltage (86) for the selected pair of drive electrodes. In some examples, each pair of measurement electrodes is a unique pair of electrodes (e.g., for the purposes of this the electrode pair 18A, 18B is the same as the electrode pair 18B, 18A). In some examples, no two pairs of measurement electrodes share a common electrode. For example, a third, different electrode pair (a second pair of measurement electrodes) may not share any electrodes with a second, different electrode pair (a first pair of measurement electrodes).

In other examples, different pairs of measurement electrodes may include one common electrode. For example, a third, different electrode pair (a second pair of measurement electrodes) may share exactly one electrode with the second, different electrode pair (a first pair of measurement electrodes). In some examples, the common electrode is reference electrode 22.

In response to determining that there is an additional pair of electrodes to be used as a pair of measurement electrodes (the "YES" branch of decision block 86), computing device 12 may control switch network 20 to couple the selected additional pair of electrodes to computing device 12. Computing device 12 then may determine a measurement voltage across the selected additional pair of electrodes.

Computing device 12 may repeat this determination (86), coupling of selected pairs of measurement electrodes, and determination of a respective measurement voltage (84) until computing device 12 determines there are no more additional pairs of electrodes 18 to be used as a pair of measurement electrodes for the selected pair of drive electrodes (the "NO" branch of decision block 86). Computing device 12 then may determine whether there is an additional pair of drive electrodes to apply the electrical signal to (88). For example, computing device 12 may be configured to utilize each unique pair of electrodes or each unique pair of electrodes separated by a predetermined number of electrodes (e.g., two electrodes) as a pair of drive electrodes.

Upon selecting a new pair of drive electrodes (the "YES" branch of decision block 88), computing device 12 may control switch network 20 to electrically couple the selected pair of drive electrodes to electrical signal source 14. Computing device 12 then may cause electrical signal source 14 to apply the electrical signal to the new selected pair of drive electrodes (82). Computing device then may cause switch network 20 to electrically couple computing device 12 to a selected pair of measurement electrodes, and may determine a respective measurement voltage between the selected pair of measurement electrodes (84). Again, computing device 12 may determine whether there is an additional pair of measurement electrodes at which to measure a measurement voltage (86) for the selected pair of drive electrodes. In response to determining that there is an additional pair of electrodes to be used as a pair of measurement electrodes (the "YES" branch of decision block 86) for the selected pair of drive electrodes, computing device 12 may control switch network 20 to couple the selected additional pair of electrodes to computing device 12. Computing device 12 then may determine a measurement voltage across the selected additional pair of electrodes. Computing device 12 may repeat this determination (86), coupling of selected pairs of measurement electrodes, and determination of a respective measurement voltage (84) until computing device 12 determines there are no more additional pairs of electrodes 18 to be used as a pair of measurement electrodes for the selected pair of drive electrodes (the "NO" branch of decision block 86).

Computing device 12 then may determine whether there is an additional pair of electrodes 18 to be used as a pair of drive electrodes (88). Computing device 12 may repeat this algorithm until computing device 12 determines there are no more additional pairs of electrodes 18 to be used as a pair of drive electrodes (the "NO" branch of decision block 88).

Once computing device 12 has determined that there are no more additional pairs of electrodes 18 to be used as a pair of drive electrodes (the "NO" branch of decision block 18), computing device 12 may determine a plurality of respective electrode pair voltages based on the measured voltages (32). Further details regarding determining a plurality of respective electrode pair voltages based on the measured voltages (32) are described above with respect to FIG. 2. Computing device 12 also may determine a temperature-corrected electrode pair value for each respective electrode pair value (34), and determine whether material 16 includes a crack or other defect based on the temperature-corrected electrode pair value or the plurality of respective temperature-corrected electrode pair values (36). Further details regarding these steps also are described above with respect to FIG. 2.

In any of the techniques described herein, computing device 12 may output a representation of the determination of whether material 16 includes a crack or other defect. In some examples, the representation may include a simplified output, such as an indication of "Yes" or "No," "Crack" or "No Crack," "Damaged" or "Intact," or the like. The representation may be textual, icon-based, color-based, or the like. For example, the representation may include a green light to represent that material 16 is still intact or a red light to represent that material 16 is damages or includes a crack or other defect.

In this way, computing device 32 may perform a four-point voltage measurement and calculate a temperature-corrected voltage pair value, which may offer improved accuracy and sensitivity for detecting cracks or other defects in material 36 compared to a two-point voltage measurement and not correcting voltage measurements for temperature. Additionally, a voltage measurement system 10 may offer improved portability and cost compared to an X-ray radiography or X-ray computed tomography system, while offering sufficient accuracy and detail to enable detection of cracks or other defects in material 16 while material 16 is being used in the field.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components.

The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Clause 1: A method comprising: determining, by a computing device, for each respective adjacent pair of electrodes of a plurality of electrodes electrically coupled to a material, a respective electrode pair voltage; determining, by the computing device, for each respective adjacent pair of electrodes, a respective temperature-corrected electrode pair value based on the respective electrode pair voltage and at least one of a respective control voltage associated with the respective adjacent pair of electrodes or a temperature correction factor; and determining, by the computing device, whether the material includes a crack or defect based on the plurality of respective temperature-corrected electrode pair values.

Clause 2: The method of clause 1, further comprising: controlling, by the computing device, an electrical signal source to apply an electrical signal to a pair of drive electrodes, wherein the plurality of electrodes electrically coupled to the material includes the pair of drive electrodes; determining, by the computing device, for each respective pair of measurement electrodes of a plurality of pairs of measurement electrodes, a respective measurement voltage across the respective pair of measurement electrodes in response to the electrical signal, wherein the plurality of electrodes electrically coupled to the material includes at least one measurement electrode of each respective pair of measurement electrodes; and determining, by the computing device, for each respective adjacent pair of electrodes of the plurality of electrodes electrically coupled to the material, the respective electrode pair voltage comprises determining the respective electrode pair voltage based on the respective measurement voltages.

Clause 3: The method of clause 2, wherein the plurality of electrodes electrically coupled to the material includes both measurement electrodes of each respective the pair of measurement electrodes.

Clause 4: The method of clause 3, wherein the measurement electrodes of each respective pair of measurement electrodes are adjacent to each other, and wherein each respective measurement voltage is a corresponding respective electrode pair voltage.

Clause 5: The method of any one of clauses 1 to 4, wherein the electrical signal comprises a voltage signal or a current signal.

Clause 6: The method of claim 1, wherein: determining the respective temperature-corrected electrode pair value comprises, for each respective electrode pair voltage, determining a respective ratio between the respective electrode pair voltage and a control voltage associated with the respective adjacent pair of electrodes; and determining whether the material includes the crack or defect based on the respective temperature-corrected electrode pair values comprises determining whether the material includes the crack or defect based on the plurality of respective ratios.

Clause 7: The method of clause 6, wherein determining whether the material includes the crack or defect based on the respective temperature-corrected electrode pair values further comprises: determining an average of the respective ratios; subtracting the average of the respective ratios from each respective ratio to determine a plurality of respective ratio differences; and determining whether the material includes the crack or defect based on the plurality of respective ratio differences.

Clause 8: The method of any one of clauses 1 to 7, wherein determining whether the material includes the crack or defect based on the plurality of respective temperature-corrected electrode pair values comprises identifying at least one outlier respective ratio difference having a higher respective ratio difference.

Clause 9: The method of any one of clauses 1 to 8, wherein determining whether the material includes the crack or defect based on the plurality of respective temperature-corrected electrode pair values comprises taking each respective temperature-corrected electrode pair value of the plurality of respective temperature-corrected electrode pair values to a predetermined power to determine a plurality of respective products, summing the plurality of respective products, and comparing the sum to a threshold value.

Clause 10: The method of any one of clauses 1 to 8, wherein determining whether the material includes the crack or defect based on the plurality of respective temperature-corrected electrode pair values comprises identifying at least one predetermined pattern in a set of respective temperature-corrected electrode pair values associated with adjacent pairs of electrodes.

Clause 11: The method of clause 10, wherein identifying at least one predetermined pattern comprises identifying at least one low-high-low pattern in a set of respective temperature-corrected electrode pair values associated with adjacent pairs of electrodes Clause 12: The method of any one of clauses 1 to 11, wherein the material comprises an electrically conductive or electrically semiconductive material.

Clause 13: The method of any one of clauses 1 to 12, wherein the material comprises a ceramic.

Clause 14: The method of clause 6 or 7, wherein the control voltage is measured at a different temperature than the measurement voltage.

Clause 15: The method of any one of clauses 1 to 14, further comprising: determining a temperature-dependent calibration curve; determining a respective threshold value for each temperature of a plurality of temperatures based on the temperature-dependent calibration curve; determining a temperature of the material at a time at which determining the measurement voltage across the pair of measurement electrodes in response to the electrical signal conducted between the pair of drive electrodes is performed; and selecting a respective threshold value based on the temperature, wherein determining whether the material includes the crack or defect based on the respective temperature-corrected electrode pair values comprises determining whether the material includes the crack or defect based on the respective temperature-corrected electrode pair values and the respective threshold value.

Clause 16: A system comprising: a computing device configured to: determine, for each respective adjacent pair of electrodes of a plurality of electrodes electrically coupled to a material, a respective electrode pair voltage; determine, for each respective adjacent pair of electrodes, a respective temperature-corrected electrode pair value based on the respective electrode pair voltage and at least one of a respective control voltage associated with the respective adjacent pair of electrodes or a temperature correction factor; and determine whether the material includes a crack or defect based on the plurality of respective temperature-corrected electrode pair values.

Clause 17: The system of clause 16, further comprising: the material; the plurality of electrodes electrically coupled to the material; and an electrical signal source; wherein the computing device is further configured to: control the electrical signal source to apply an electrical signal to a pair of drive electrodes, wherein the plurality of electrodes includes the pair of drive electrodes; determine, for each respective pair of measurement electrodes of a plurality of pairs of measurement electrodes, a respective measurement voltage across the respective pair of measurement electrodes in response to the electrical signal, wherein the plurality of electrodes electrically coupled to the material includes at least one measurement electrode of each respective pair of measurement electrodes; and determine, for each respective adjacent pair of electrodes of the plurality of electrodes electrically coupled to the material, the respective electrode pair voltage comprises determining the respective electrode pair voltage based on the respective measurement voltages.

Clause 18: The system of clause 17, wherein the plurality of electrodes includes both measurement electrodes of each respective the pair of measurement electrodes.

Clause 19: The system of clause 18, wherein the measurement electrodes of each respective pair of measurement electrodes are adjacent to each other, and wherein each respective measurement voltage is a corresponding respective electrode pair voltage.

Clause 20: The system of any one of clauses 16 to 19, wherein the electrical signal comprises a voltage signal or a current signal.

Clause 21: The system of clause 16, wherein: the computing device is configured to determine the respective temperature-corrected electrode pair value by at least, for each respective electrode pair voltage, determining a respective ratio between the respective electrode pair voltage and a control voltage associated with the respective adjacent pair of electrodes; and the computing device is configured to determine whether the material includes the crack or defect based on the respective temperature-corrected electrode pair values by at least determining whether the material includes the crack or defect based on the plurality of respective ratios.

Clause 22: The system of clause 21, wherein the computing device is further configured to determine whether the material includes the crack or defect based on the respective temperature-corrected electrode pair values by at least: determining an average of the respective ratios; subtracting the average of the respective ratios from each respective ratio to determine a plurality of respective ratio differences; and determining whether the material includes the crack or defect based on the plurality of respective ratio differences.

Clause 23: The system of any one of clauses 16 to 22, wherein the computing device is configured to determine whether the material includes the crack or defect based on the plurality of respective temperature-corrected electrode pair values by at least identifying at least one outlier respective ratio difference having a higher respective ratio difference.

Clause 24: The system of any one of clauses 16 to 22, wherein the computing device is configured to determine whether the material includes the crack or defect based on the plurality of respective temperature-corrected electrode pair values by at least taking each respective temperature-corrected electrode pair value of the plurality of respective temperature-corrected electrode pair values to a predetermined power to determine a plurality of respective products, summing the plurality of respective products, and comparing the sum to a threshold value.

Clause 25: The system of any one of clauses 16 to 22, wherein the computing device is configured to determine whether the material includes the crack or defect based on the plurality of respective temperature-corrected electrode pair values by at least identifying at least one predetermined pattern in a set of respective temperature-corrected electrode pair values associated with adjacent pairs of electrodes.

Clause 26: The system of clause 25, wherein the computing device is configured to identify at least one predetermined pattern by at least identifying a low-high-low pattern in a set of respective temperature-corrected electrode pair values associated with adjacent pairs of electrodes Clause 27: The system of any one of clauses 16 to 26, wherein the material comprises an electrically conductive or electrically semiconductive material.

Clause 28: The system of any one of clauses 16 to 27, wherein the material comprises a ceramic.

Clause 29: The system of clause 21, wherein the control voltage is measured at a different temperature than the measurement voltage.

Clause 30: The system of any one of clauses 16 to 29, wherein the computing device is further configured to: determine a temperature-dependent calibration curve; determine a respective threshold value for each temperature of a plurality of temperatures based on the temperature-dependent calibration curve; determine a temperature of the material at a time at which determining the measurement voltage across the pair of measurement electrodes in response to the electrical signal conducted between the pair of drive electrodes is performed; and select a respective threshold value based on the temperature, wherein determining whether the material includes the crack or defect based on the respective temperature-corrected electrode pair values comprises determining whether the material includes the crack or defect based on the respective temperature-corrected electrode pair values and the respective threshold value.

Clause 31: A computer readable storage medium comprising instructions that, when executed, cause a computing device to: determine, for each respective adjacent pair of electrodes of a plurality of electrodes electrically coupled to a material, a respective electrode pair voltage; determine, for each respective adjacent pair of electrodes, a respective temperature-corrected electrode pair value based on the respective electrode pair voltage and at least one of a respective control voltage associated with the respective adjacent pair of electrodes or a temperature correction factor; and determine whether the material includes a crack or defect based on the plurality of respective temperature-corrected electrode pair values.

Clause 32: The computer readable storage medium of clause 31, further comprising instructions that, when executed, cause the computing device to: control an electrical signal source to apply an electrical signal to a pair of drive electrodes, wherein the plurality of electrodes includes the pair of drive electrodes; determine, for each respective pair of measurement electrodes of a plurality of pairs of measurement electrodes, a respective measurement voltage across the respective pair of measurement electrodes in response to the electrical signal, wherein the plurality of electrodes electrically coupled to the material includes at least one measurement electrode of each respective pair of measurement electrodes; and determine, for each respective adjacent pair of electrodes of the plurality of electrodes electrically coupled to the material, the respective electrode pair voltage comprises determining the respective electrode pair voltage based on the respective measurement voltages.

Clause 33: The computer readable storage medium of clause 31 or 32, wherein the electrical signal comprises a voltage signal or a current signal.

Clause 34: The computer readable storage medium of any one of claims 31 to 33, wherein: the instructions that, when executed, cause the computing device to determine the respective temperature-corrected electrode pair value comprise instructions that, when executed, cause the computing device to, for each respective electrode pair voltage, determining a respective ratio between the respective electrode pair voltage and a control voltage associated with the respective adjacent pair of electrodes; and the instructions that, when executed, cause the computing device to determine whether the material includes the crack or defect based on the respective temperature-corrected electrode pair values comprise instructions that, when executed, cause the computing device to determine whether the material includes the crack or defect based on the plurality of respective ratios.

Clause 35: The computer readable storage medium of clause 34, wherein the instructions that, when executed, cause the computing device to determine whether the material includes the crack or defect based on the respective temperature-corrected electrode pair values further comprise instructions that, when executed, cause the computing device to: determine an average of the respective ratios; subtract the average of the respective ratios from each respective ratio to determine a plurality of respective ratio differences; and determine whether the material includes the crack or defect based on the plurality of respective ratio differences.

Clause 36: The computer readable storage medium of any one of clauses 31 to 35, wherein instructions that, when executed, cause the computing device to determine whether the material includes the crack or defect based on the plurality of respective temperature-corrected electrode pair values comprise instructions that, when executed, cause the computing device to identify at least one outlier respective ratio difference having a higher respective ratio difference.

Clause 37: The computer readable storage medium of any one of clauses 31 to 35, wherein the instructions that, when executed, cause the computing device to determine whether the material includes the crack or defect based on the plurality of respective temperature-corrected electrode pair values comprise instructions that, when executed, cause the computing device to take each respective temperature-corrected electrode pair value of the plurality of respective temperature-corrected electrode pair values to a predetermined power to determine a plurality of respective products, sum the plurality of respective products, and compare the sum to a threshold value.

Clause 38: The computer readable storage medium of any one of clauses 31 to 35, wherein the instructions that, when executed, cause the computing device to determine whether the material includes the crack or defect based on the plurality of respective temperature-corrected electrode pair values comprise instructions that, when executed, cause the computing device to identify at least one predetermined pattern in a set of respective temperature-corrected electrode pair values associated with adjacent pairs of electrodes.

Clause 39: The computer readable storage medium of clause 38, wherein the instructions that, when executed, cause the computing device to identify at least one predetermined pattern comprise instructions that, when executed, cause the computing device to identify a low-high-low pattern in a set of respective temperature-corrected electrode pair values associated with adjacent pairs of electrodes Clause 40: The computer readable storage medium of any one of clauses 31 to 39, wherein the material comprises an electrically conductive or electrically semiconductive material.

Clause 41: The computer readable storage medium of clause 34, wherein the control voltage is measured at a different temperature than the measurement voltage.

Clause 42: The computer readable storage medium of any one of clauses 31 to 41, further comprising instructions that, when executed, cause the computing device to: determine a temperature-dependent calibration curve; determine a respective threshold value for each temperature of a plurality of temperatures based on the temperature-dependent calibration curve; determine a temperature of the material at a time at which determining the measurement voltage across the pair of measurement electrodes in response to the electrical signal conducted between the pair of drive electrodes is performed; and select a respective threshold value based on the temperature, wherein determining whether the material includes the crack or defect based on the respective temperature-corrected electrode pair values comprises determining whether the material includes the crack or defect based on the respective temperature-corrected electrode pair values and the respective threshold value.

Various examples have been described. These and other examples are within the scope of the following claims.

What is claimed is:

1. A method for determining whether a material includes a defect, the method comprising:
controlling, by a computing device, an electrical signal source to apply an electrical signal to the material via a pair of drive electrodes, the pair of drive electrodes being included in a plurality of electrodes electrically coupled to the material, wherein all remaining electrodes of the plurality of electrodes other than the pair of drive electrode form respective adjacent pairs of measurement electrodes;
determining, by the computing device, for each respective adjacent pair of measurement electrodes of the plurality of electrodes electrically coupled to the material,
a respective measurement electrode pair voltage,
a temperature correction factor based on a relationship between the respective measurement electrode pair voltage and a temperature at which the respective electrode pair voltage is measured;
a respective temperature-corrected measurement electrode pair voltage by applying the temperature correction factor to the respective measurement electrode pair voltage, and
a respective ratio between the respective temperature-corrected measurement electrode pair voltage and a control voltage associated with the respective adjacent pair of measurement electrodes;
determining, by the computing device, an average of the respective ratios;
subtracting, by the computing device, the average of the respective ratios from each respective ratio to determine a plurality of respective ratio differences; and
determining, by the computing device, that the material includes the defect based on the plurality of respective ratio differences.

2. The method of claim 1, wherein the electrical signal comprises at least one of a voltage signal or a current signal.

3. The method of claim 1, wherein determining that the material includes the defect based on the plurality of respective ratio differences comprises identifying, by the computing device, at least one outlier ratio difference from the plurality of respective ratio differences based on the at least one outlier ratio difference having a higher ratio difference than a remainder of the plurality of respective ratio differences.

4. The method of claim 1, wherein the material comprises an electrically conductive material or an electrically semiconductive material.

5. The method of claim 1, wherein the material comprises a ceramic.

6. The method of claim 1, wherein the control voltage is measured at a different temperature than the temperature at which the respective measurement electrode pair voltages are measured.

7. The method of claim 1, wherein the defect is a crack in the material.

8. A system for determining whether a material includes a defect, the system comprising:
the material;
a plurality of electrodes electrically coupled to the material, wherein the plurality of electrodes includes a pair of drive electrodes, and wherein all remaining electrodes of the plurality of electrodes other than the pair of drive electrode form respective adjacent pairs of measurement electrodes;
an electrical signal source; and
a computing device configured to:
control the electrical signal source to apply an electrical signal to a pair of drive electrodes included in the plurality of electrodes;
determine, for each respective adjacent pair of measurement electrodes of the plurality of electrodes electrically coupled to the material,
a respective measurement electrode pair voltage,
a temperature correction factor based on a relationship between the respective measurement electrode pair voltage and a temperature at which the respective electrode pair voltage is measured,
a respective temperature-corrected measurement electrode pair voltage by applying the temperature correction factor to the respective measurement electrode pair voltage, and
a respective ratio between the respective temperature-corrected measurement electrode pair voltage and a control voltage associated with the respective adjacent pair of measurement electrodes;
determine an average of the respective ratios;
subtract the average of the respective ratios from each respective ratio to determine a plurality of respective ratio differences; and
determine whether the material includes the defect based on the plurality of respective ratio differences.

9. The system of claim 8, wherein to determine whether the material includes the defect based on the plurality of respective ratio differences, the computing device is configured to identify at least one outlier ratio difference in the plurality of respective ratio differences based on the at least one outlier ratio difference having a higher respective ratio difference than a remainder of the plurality of respective ratio differences.

10. The system of claim 9, wherein the material comprises an electrically conductive material or an electrically semiconductive material.

11. The system of claim 9, wherein the material comprises a ceramic.

12. The system of claim 8, wherein the control voltage is measured at a different temperature than the temperature at which the respective measurement electrode pair voltages are measured.

13. The system of claim 8, wherein the defect is a crack in the material.

14. The system of claim 12, wherein the temperature correction factor is determined based on experimental data using the material.

15. The system of claim 12, wherein to determine the temperature correction factor, the computing device is configured to retrieve the temperature correction factor from a lookup table (LUT) that includes data based on the temperature at which the respective measurement electrode pair voltages are measured and the different temperature at which the control voltage is measured.

16. A non-transitory computer readable storage medium encoded with instructions that, when executed, cause one or more processors of a computing device to:
control an electrical signal source to apply, via pair of drive electrodes, an electrical signal to a material, the pair of drive electrodes being included in a plurality of electrodes electrically coupled to the material, wherein all remaining electrodes of the plurality of electrodes other than the pair of drive electrode form respective adjacent pairs of measurement electrodes;
determine, for each respective adjacent pair of measurement electrodes of the plurality of electrodes electrically coupled to the material,
a respective measurement electrode pair voltage,
a temperature correction factor based on a relationship between the respective measurement electrode pair voltage and a temperature at which the respective electrode pair voltage is measured;

a respective temperature-corrected measurement electrode pair voltage by applying the temperature correction factor to the respective measurement electrode pair voltage, and a respective ratio between the respective temperature-corrected measurement electrode pair voltage and a control voltage associated with the respective adjacent pair of measurement electrodes;

determine an average of the respective ratios;

subtract the average of the respective ratios from each respective ratio to determine a plurality of respective ratio differences; and determine whether the material includes a defect based on the plurality of respective ratio differences.

17. The non-transitory computer readable storage medium of claim 16, wherein the instructions that, when executed, cause the one or more processors of the computing device to determine whether the material includes the defect based on the plurality of respective ratio differences comprise instructions that, when executed, cause the one or more processors of the computing device to identify at least one outlier ratio difference in the plurality of respective ratio differences based on the outlier ratio difference having a higher respective ratio difference than a remainder of the plurality of respective ratio differences.

18. The non-transitory computer readable storage medium of claim 16, wherein the defect is a crack in the material.

\* \* \* \* \*